United States Patent
Liu et al.

(10) Patent No.: US 9,494,178 B2
(45) Date of Patent: Nov. 15, 2016

(54) METHODS FOR BONDING SUBSTRATES USING LIQUID ADHESIVE

(71) Applicant: Apple Inc., Cupertino, CA (US)

(72) Inventors: Cyrus Y. Liu, Cupertino, CA (US); Kuo-Hua Sung, Cupertino, CA (US); Po-Jui Chen, Cupertino, CA (US); Silvio Grespan, Shanghai (CN)

(73) Assignee: Apple Inc., Cupertino, CA (US)

( * ) Notice: Subject to any disclaimer, the term of this patent is extended or adjusted under 35 U.S.C. 154(b) by 226 days.

(21) Appl. No.: 14/183,224

(22) Filed: Feb. 18, 2014

(65) Prior Publication Data

US 2014/0246148 A1  Sep. 4, 2014

Related U.S. Application Data

(60) Provisional application No. 61/771,590, filed on Mar. 1, 2013.

(51) Int. Cl.
- *H05K 5/06* (2006.01)
- *F16B 11/00* (2006.01)
- *C09J 5/00* (2006.01)

(Continued)

(52) U.S. Cl.
CPC ............ *F16B 11/006* (2013.01); *B32B 5/26* (2013.01); *B32B 7/12* (2013.01); *C09J 5/00* (2013.01); *B32B 2457/00* (2013.01); *B32B 2457/20* (2013.01); *C09J 2205/31* (2013.01); *G02F 2202/28* (2013.01); *Y10T 156/10* (2015.01)

(58) Field of Classification Search
CPC ........... C09J 5/00; F16B 11/006; B32B 5/26; B32B 7/12
See application file for complete search history.

(56) References Cited

U.S. PATENT DOCUMENTS 5,217,290 A * 6/1993 Windross ............. G02B 6/0008
                                                      362/282
5,259,169 A  11/1993 Appelbaum et al.
(Continued)

FOREIGN PATENT DOCUMENTS

JP  2000-163031  6/2000
JP  2002-342033  11/2002

OTHER PUBLICATIONS

Lee, S.K. et al. (Apr. 1985). "A Multi-Touch Three Dimensional Touch-Sensitive Tablet," Proceedings of CHI: ACM Conference in Human Factors in Computing Systems, pp. 21-25.
(Continued)

*Primary Examiner* — Daniel McNally
(74) *Attorney, Agent, or Firm* — Treyz Law Group, P.C.; G. Victor Treyz; Joseph F. Guihan

(57) ABSTRACT

Structures in an electronic device such as substrates associated with a display may be bonded together using liquid adhesive. Fiber-based equipment may be used to apply ultraviolet light to peripheral edges of an adhesive layer during bonding. There-dimensional adhesive shapes may be produced using nozzles with adjustable openings, computer-controlled positioners, and other adhesive dispensing equipment. Ultraviolet light may be applied to liquid adhesive through a mask with an opacity gradient. Adjustable shutter structures may control adhesive exposure to ultraviolet light. Ultraviolet light exposure may be used to create an adhesive dam that helps create a well defined adhesive border. Multiple layers of adhesive may be applied between a pair of substrates.

17 Claims, 40 Drawing Sheets

(51) Int. Cl.
*B32B 5/26* (2006.01)
*B32B 7/12* (2006.01)

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 5,882,451 A | 3/1999 | Sasaki et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,418,251 B1* | 7/2002 | Boscha | G02B 6/4204 372/29.02 |
| 6,451,152 B1* | 9/2002 | Holmes | B23K 26/034 156/173 |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,480,013 B2 | 1/2009 | Asami et al. | |
| 7,663,607 B2 | 2/2010 | Hotelling et al. | |
| 7,722,939 B2 | 5/2010 | Schwantes et al. | |
| 7,927,440 B2 | 4/2011 | Matsuhira | |
| 8,081,177 B2 | 12/2011 | White et al. | |
| 8,119,214 B2 | 2/2012 | Schwantes et al. | |
| 8,608,896 B2 | 12/2013 | Horstkemper et al. | |
| 2004/0129382 A1 | 7/2004 | Terashi et al. | |
| 2006/0026521 A1 | 2/2006 | Hotelling et al. | |
| 2006/0197753 A1 | 9/2006 | Hotelling | |
| 2009/0066862 A1* | 3/2009 | Ishii | G02F 1/133308 349/12 |
| 2010/0003425 A1* | 1/2010 | Kamata | G02F 1/133308 428/1.5 |
| 2011/0151202 A1 | 6/2011 | Feinstein et al. | |
| 2011/0255828 A1* | 10/2011 | Sudarshanam | G02B 6/262 385/31 |
| 2012/0092817 A1 | 4/2012 | Shibahara et al. | |
| 2012/0219257 A1 | 8/2012 | Meadowcroft et al. | |
| 2013/0064967 A1 | 3/2013 | Feinstein et al. | |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Scierice at Carnegie Mellon University, 285 pages.

Rubine D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

METHODS FOR BONDING SUBSTRATES USING LIQUID ADHESIVE

This application claims priority to U.S. provisional patent application No. 61/771,590 filed Mar. 1, 2013, which is hereby incorporated by reference herein in its entirety.

BACKGROUND

This relates generally to adhesives and, more particularly, to using liquid adhesives to assemble components.

Electrical devices such as computers and cellular telephones contain components that are attached together using adhesive. For example, liquid optically clear adhesive may be used to attach a display cover glass layer to a liquid crystal display module. If care is not taken, adhesive borders may be poorly defined and voids may be formed within the adhesive. This can degrade adhesive performance and can create visible defects.

It would therefore be desirable to be able to form improved adhesive bonds between structures in an electronic device.

SUMMARY

An electronic device may be provided that includes structures that are attached together using adhesive. Liquid adhesive such as liquid optically clear adhesive may be used to bond together substrates such as display layer substrates for a display.

Ultraviolet light may be applied to the border of an adhesive layer using fiber-based equipment. The fiber-based equipment may include a strip of fibers that apply the ultraviolet light along an exposed adhesive edge. Light may be applied to one or more edges simultaneously using multiple bundles of fibers. Side-firing fibers may be used to allow the fiber-based equipment to be introduced into confined areas.

Slit-based adhesive dispensers and other adhesive dispensers may be provided with adjustable nozzles. Computer-controlled positioners and adjustable nozzles may be used to create three-dimensional adhesive layers. The three-dimensional adhesive layers may have protruding portions that create well-defined initial contact points between the adhesive and substrate layers to minimize voids during bonding.

Localized and global energy may be applied to adhesive to form adhesive protrusions and other features that facilitate the formation of satisfactory adhesive bonds. Energy may be applied to adhesive during precuring operations and during substrate bonding. Bonding stage electrodes or other structures may be used in applying localized and global energy in the form of heat, light, static electric fields, static magnetic fields, radio-frequency signals, etc.

Light masks with transmission gradients may be used in applying light to adhesive to cure the adhesive. Adhesive dam structures with tapered inner edges may be formed using light masks with light transparency gradients. Movable shutter systems may also be used in controlling the application of light to an adhesive layer.

Further features, their nature and various advantages will be more apparent from the accompanying drawings and the following detailed description of the preferred embodiments.

Figure 17:
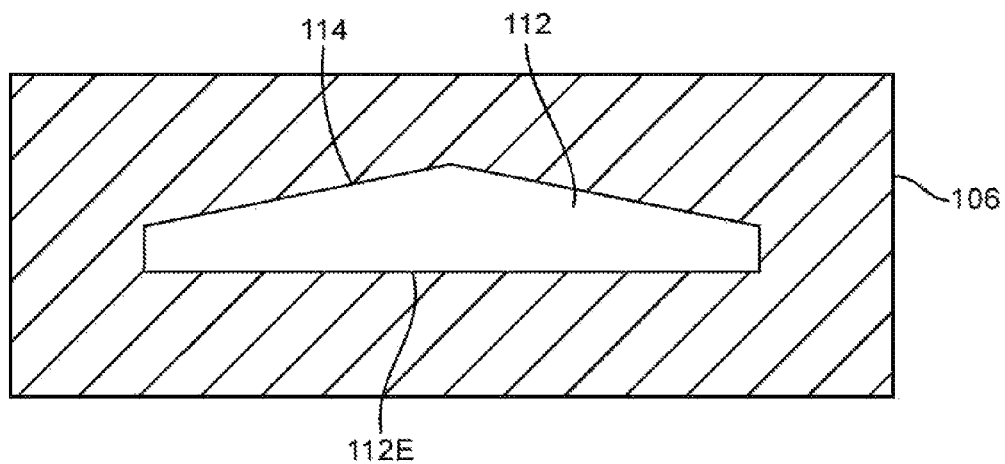

FIG. 17 is a diagram of an illustrative nozzle in a slit dispenser for applying adhesive to a substrate in accordance with an embodiment.

Figure 18:
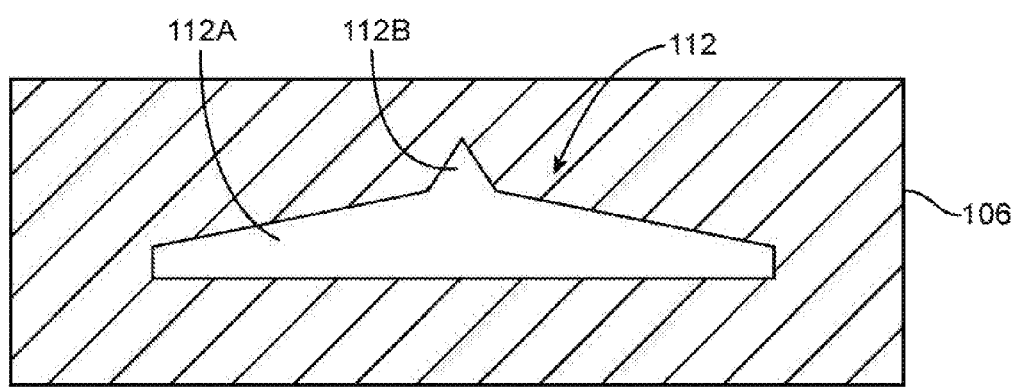

FIG. 18 is a diagram of an illustrative nozzle with a triangular central portion in a slit dispenser for applying adhesive to a substrate in accordance with an embodiment.

Figure 19:
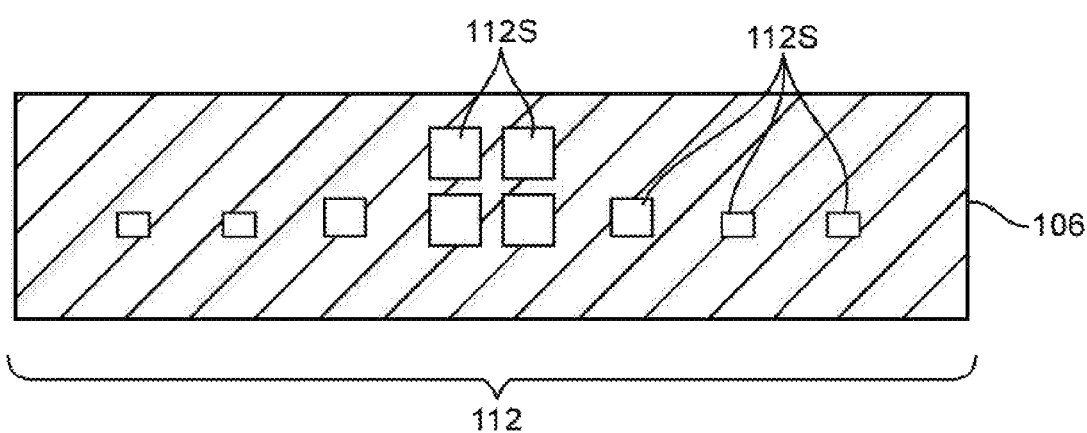

FIG. 19 is a diagram of an illustrative adhesive dispensing structures such as an adhesive dispensing nozzle with a pattern of openings for creating an adhesive layer with a protruding central portion in accordance with an embodiment.

Figure 20:
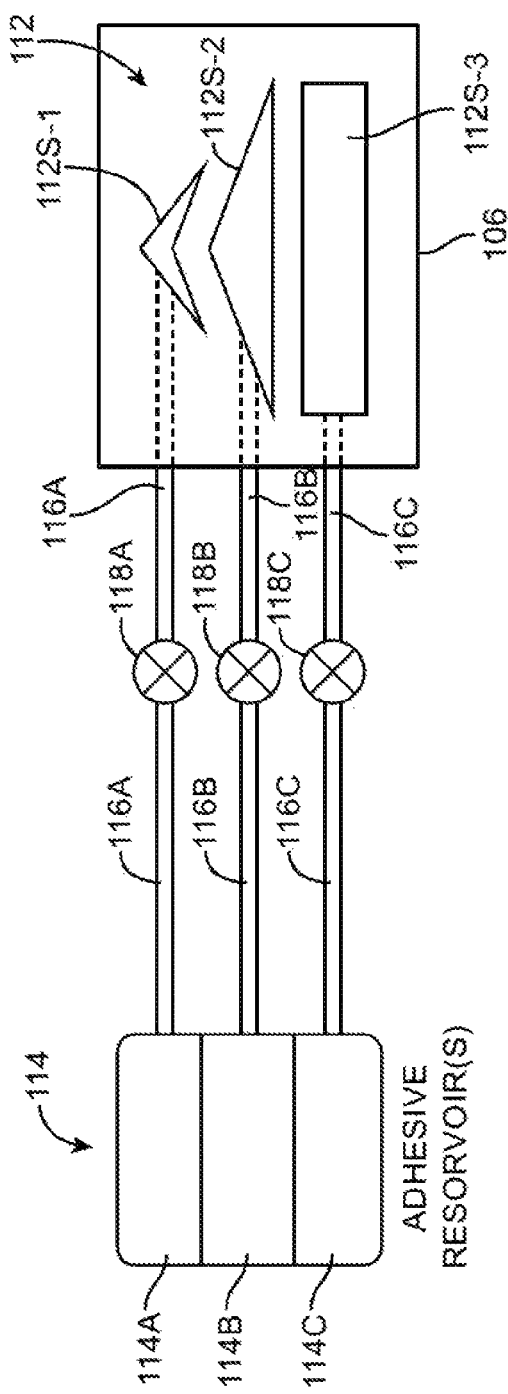

FIG. 20 is a diagram of a slit dispenser with multiple individually controlled nozzle slits in accordance with an embodiment.

Figure 21:
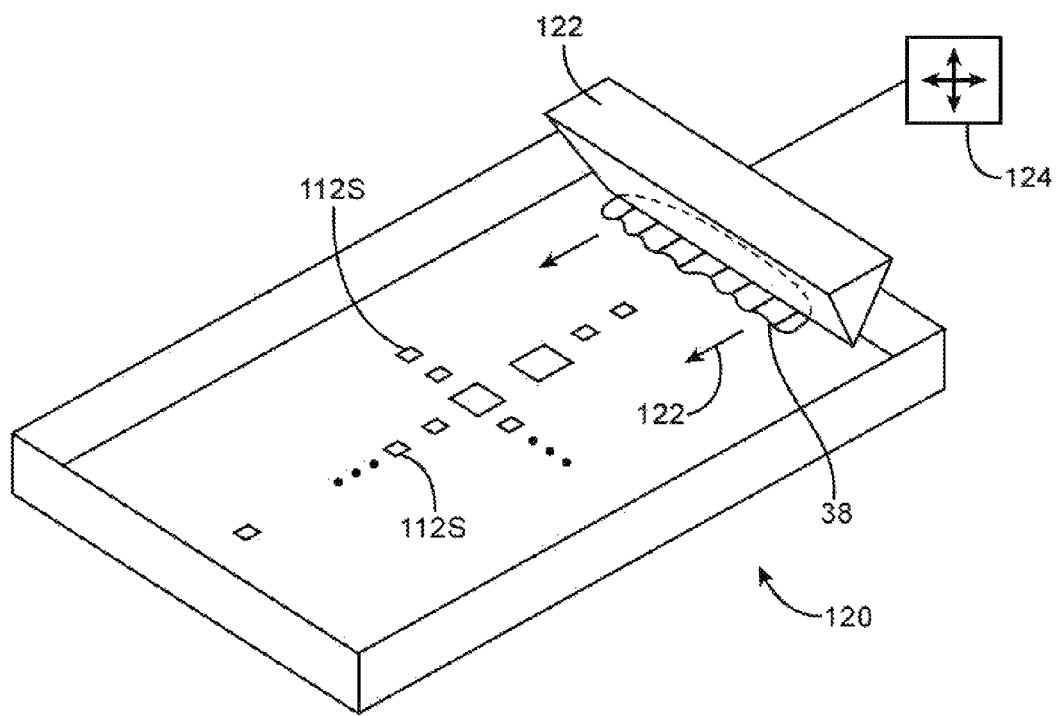

FIG. 21 is a perspective view of an illustrative screen printing tool for patterning adhesive in accordance with an embodiment.

Figure 22:
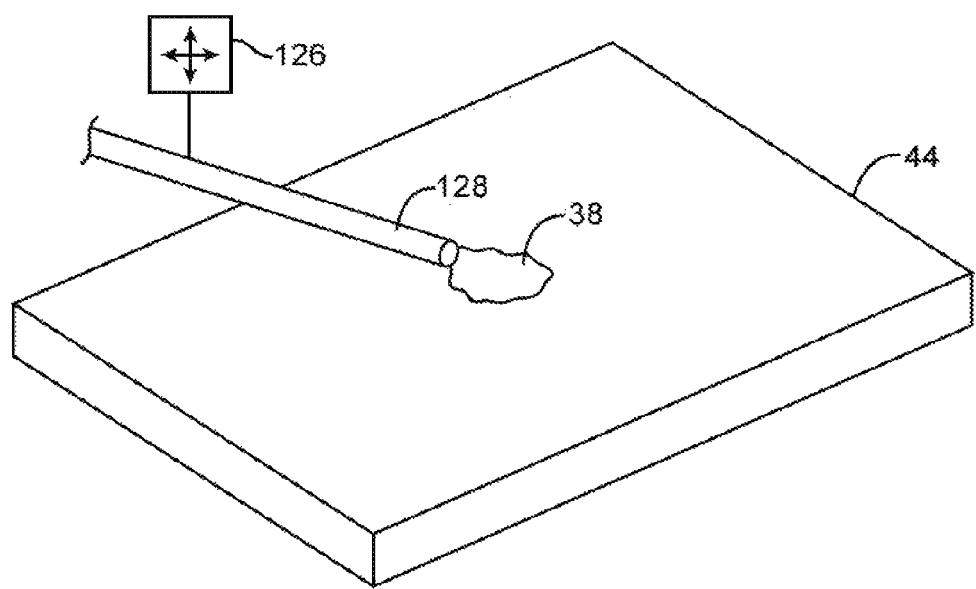

FIG. 22 is a perspective view of an illustrative computer-controlled needle dispenser for applying adhesive in a pattern on a substrate in accordance with an embodiment.

Figure 23:
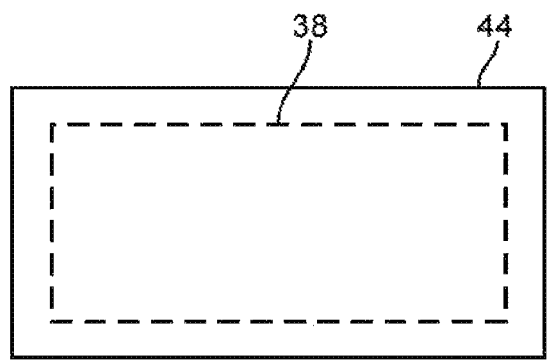

FIG. 23 is a top view of an illustrative substrate coated with a layer of adhesive in a rectangular pattern accordance with an embodiment.

Figure 24:
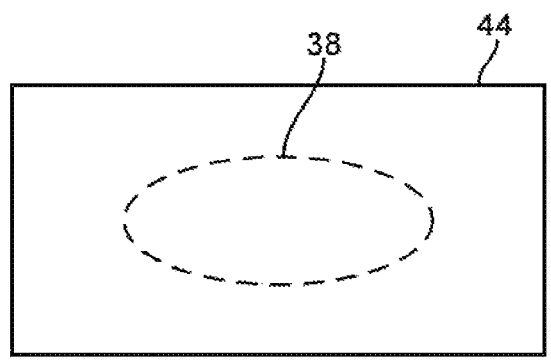

FIG. 24 is a top view of an illustrative substrate coated with a layer of adhesive in an oval pattern in accordance with an embodiment.

Figure 25:
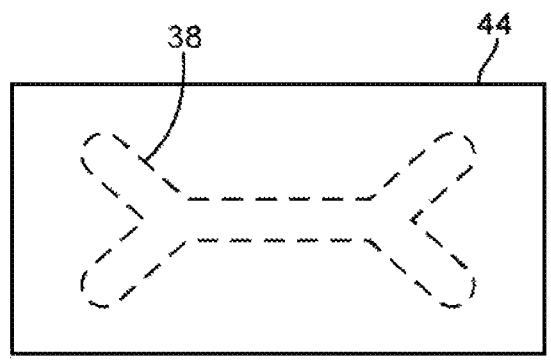

FIG. 25 is a top view of an illustrative substrate coated with a layer of adhesive in a double-Y pattern in accordance with an embodiment.

Figure 26:
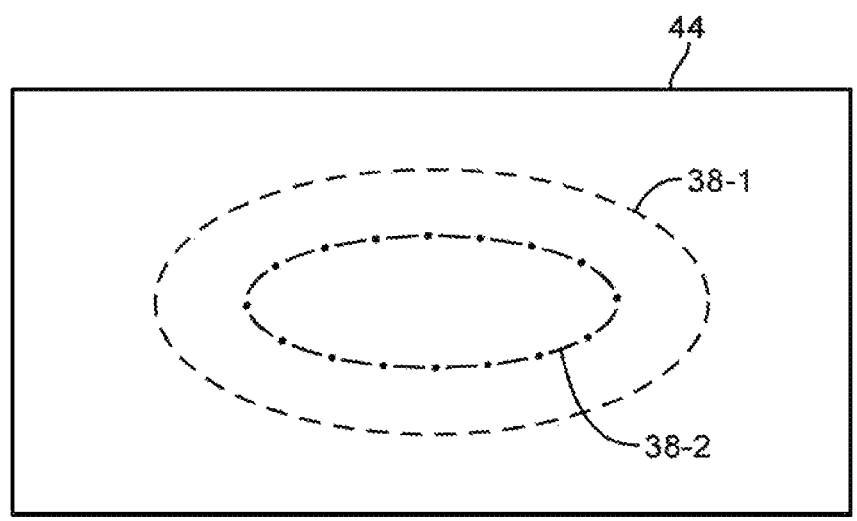

FIG. 26 is a top view of an illustrative substrate coated with two overlapping layers of adhesive to create adhesive with a raised central portion in accordance with an embodiment.

Figure 27:
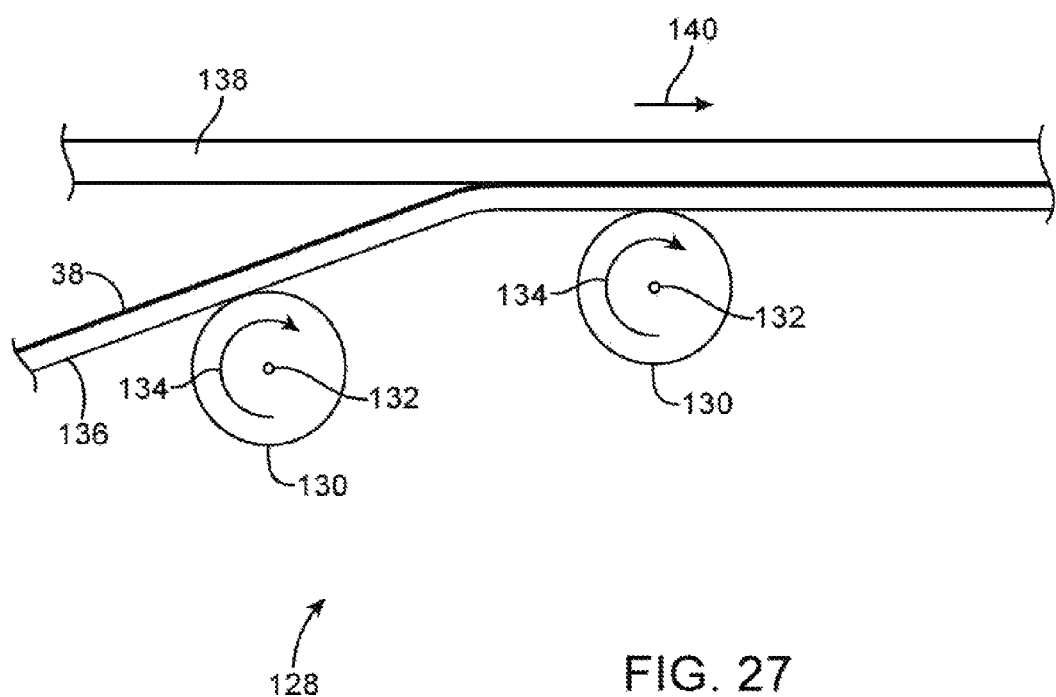

FIG. 27 is a cross-sectional side view of a roller-based lamination system for attaching a flexible substrate to another substrate with adhesive in accordance with an embodiment.

Figure 28:
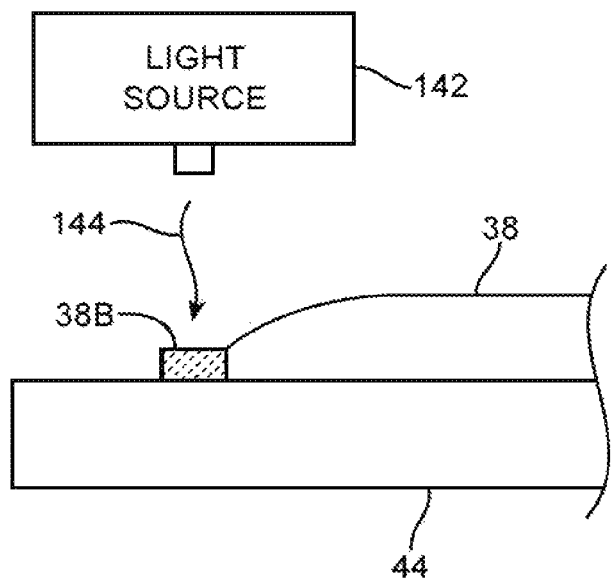

FIG. 28 is a diagram of a light-based system for curing the edge of an adhesive layer to control the boundary of the adhesive layer in accordance with an embodiment.

Figure 29:
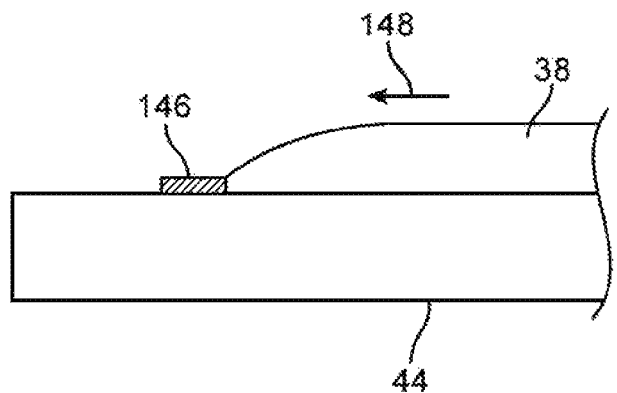

FIG. 29 is a diagram of a substrate having a surface with a patterned material for helping to control the boundary of the adhesive in accordance with an embodiment.

Figure 30:
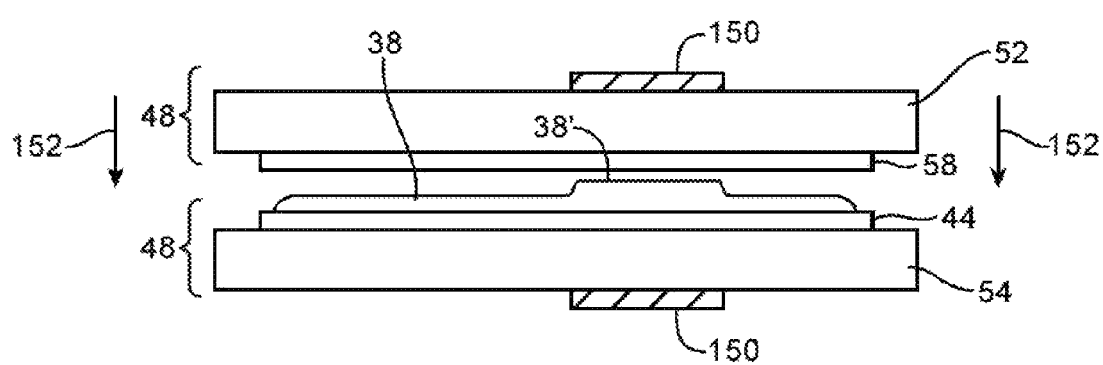

FIG. 30 is a cross-sectional side view of bonding equipment with electrodes or other structures for applying localized energy to a layer of adhesive between a pair of opposing substrates in accordance with an embodiment.

Figure 31:
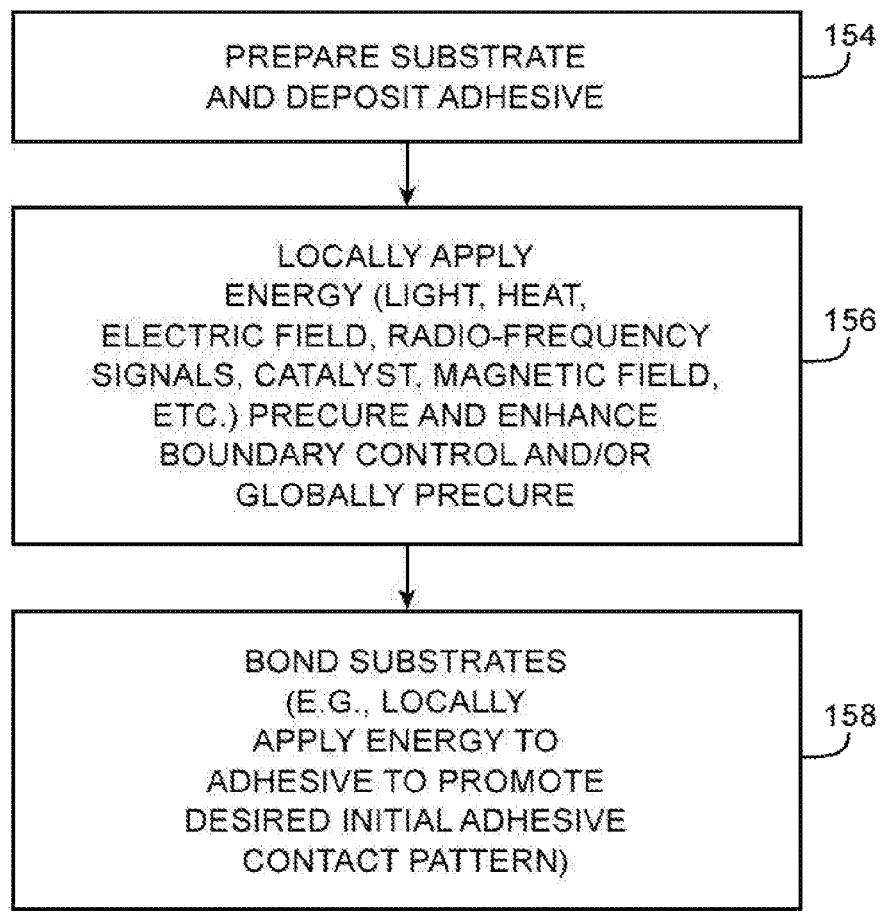

FIG. 31 is a flow chart of illustrative steps involved in locally applying energy to adhesive during precuring and substrate bonding operations in accordance with an embodiment.

Figure 32:
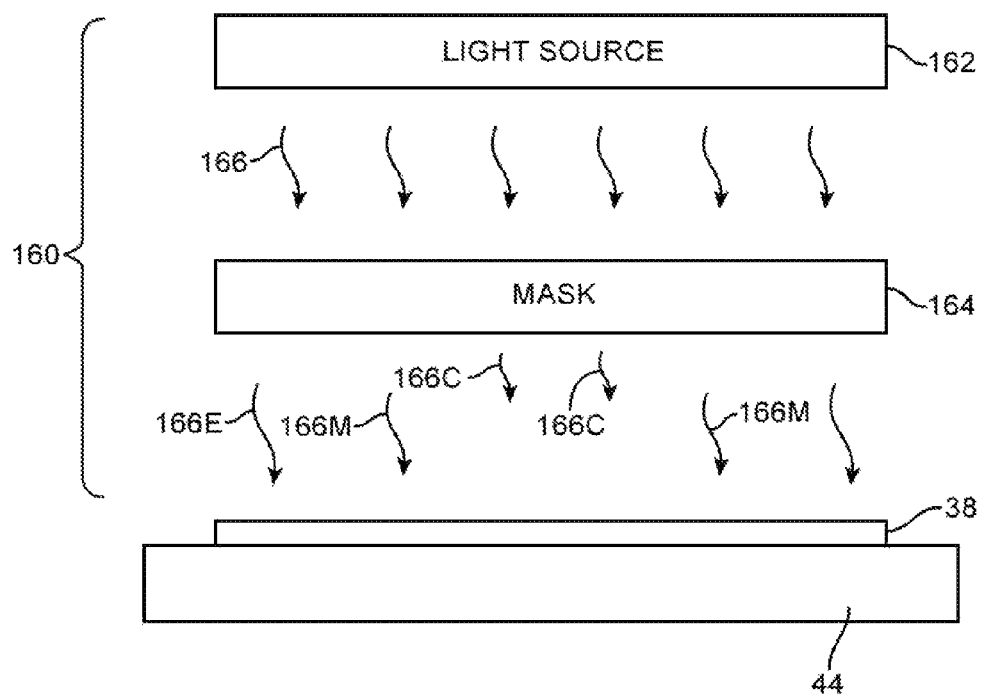

FIG. 32 is a diagram of a light-mask-based system for applying light in a desired pattern to a layer of adhesive on a substrate in accordance with an embodiment.

Figure 33:
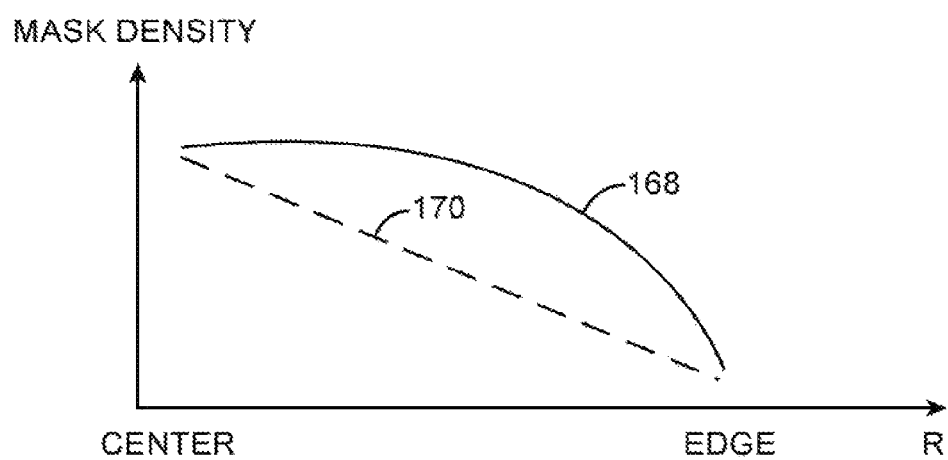

FIG. 33 is a graph showing how mask density in a system of the type shown in FIG. 32 may vary as a function of distance from the center of the mask in accordance with an embodiment.

Figure 34:
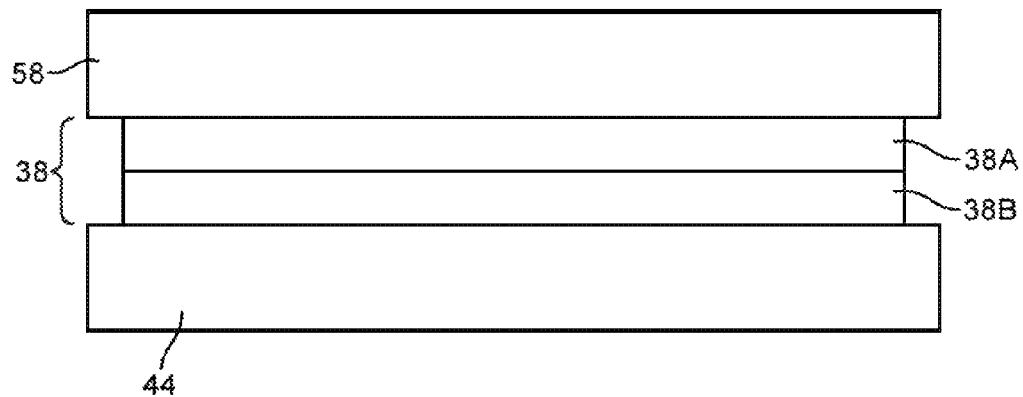

FIG. 34 is a cross-sectional side view of substrates such as display layers that have been attached using two layers of adhesive in accordance with an embodiment.

Figure 35:
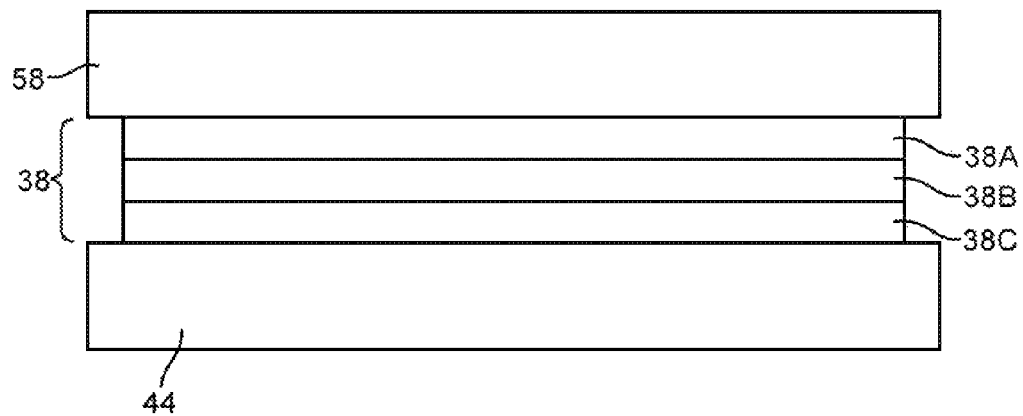

FIG. 35 is a cross-sectional side view of substrates such as display layers that have been attached using three layers of adhesive in accordance with an embodiment.

Figure 36:
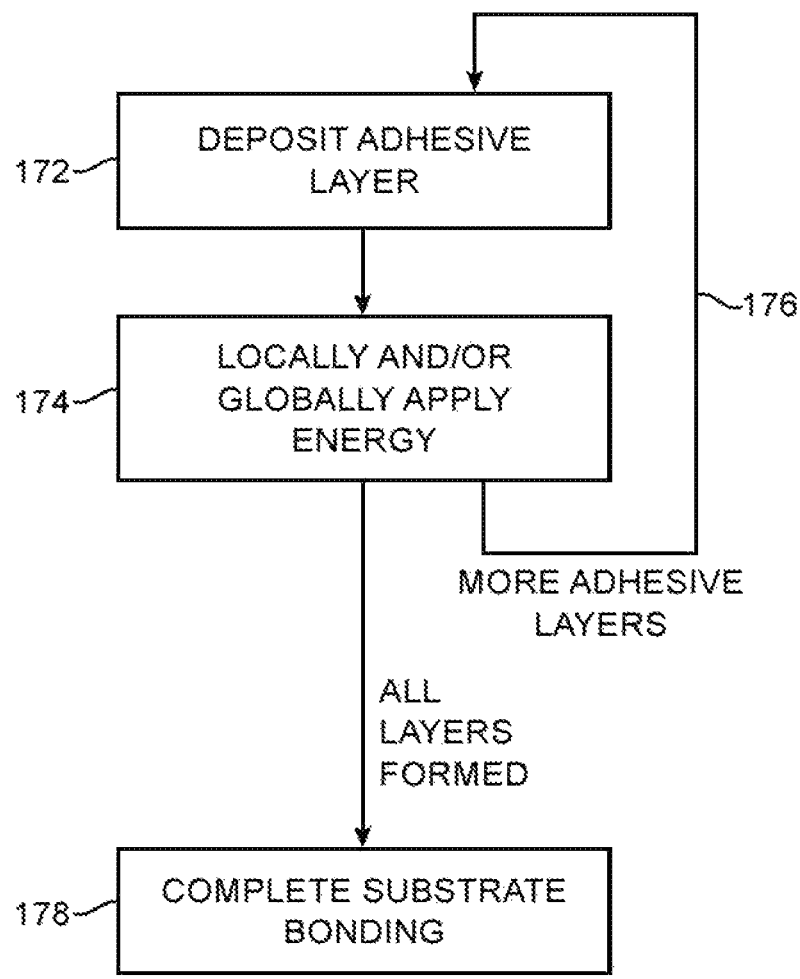

FIG. 36 is a flow chart of steps involved in bonding substrates together using one or more layers of locally or globally modified adhesive in accordance with an embodiment.

Figure 37:
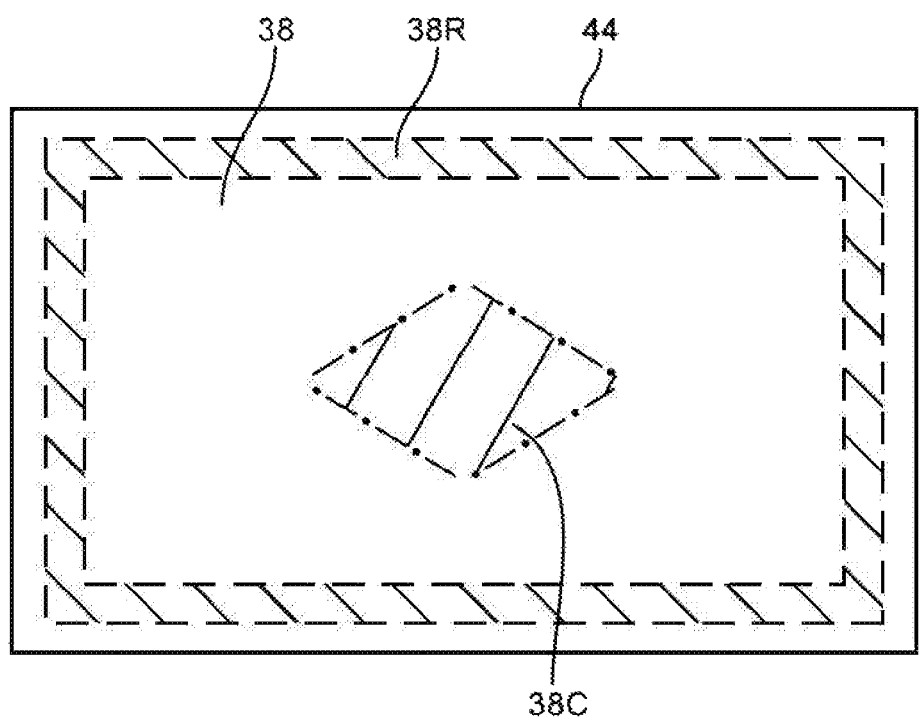

FIG. 37 is a top view of a substrate having a layer of adhesive that has been illuminated with patterned light to control lateral adhesive spread and having adhesive that has been illuminated with patterned light to produce a protruding central portion in accordance with an embodiment.

Figure 38:
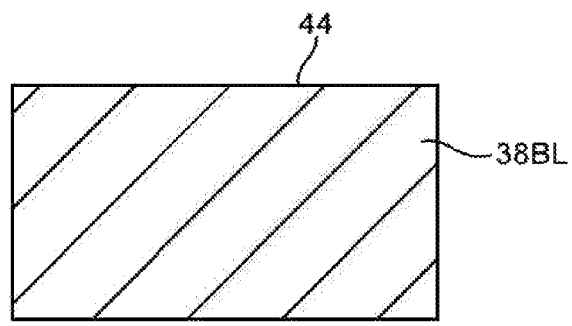

FIG. 38 is a top view of a substrate that has been covered using a layer of adhesive in accordance with an embodiment.

Figure 39:
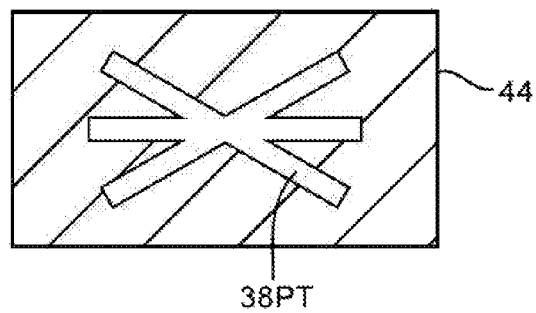

FIG. 39 is a top view of the substrate of FIG. 38 following deposition of a patterned additional layer of adhesive in accordance with an embodiment.

Figure 40:
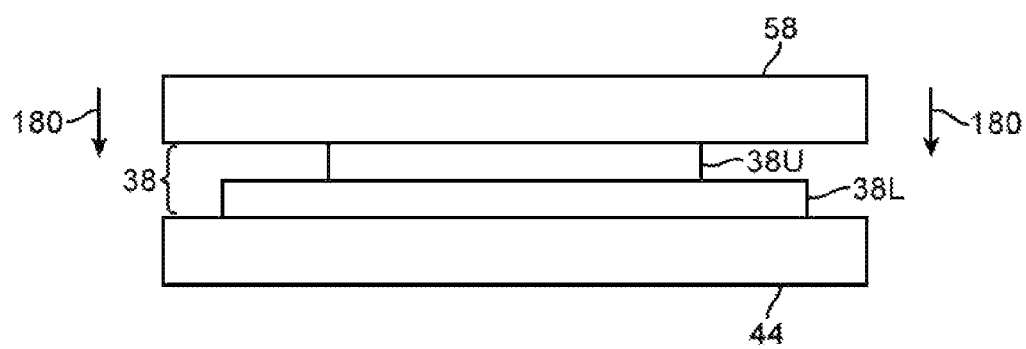

FIG. 40 is a cross-sectional side view of bonding stage equipment being used to bond substrates together using upper and lower layers of adhesive in accordance with an embodiment.

Figure 41:
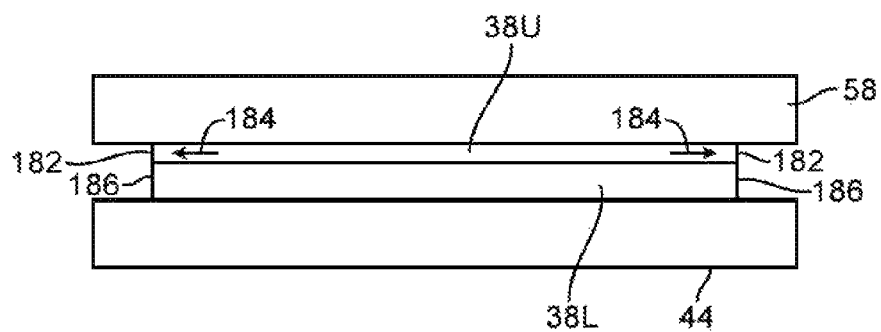

FIG. 41 is a cross-sectional side view of the bonding stage equipment of FIG. 40 after pressing together the substrates and compressing the adhesive between the substrates until the upper adhesive layer flows sufficiently to cover the lower adhesive layer in accordance with an embodiment.

Figure 42:
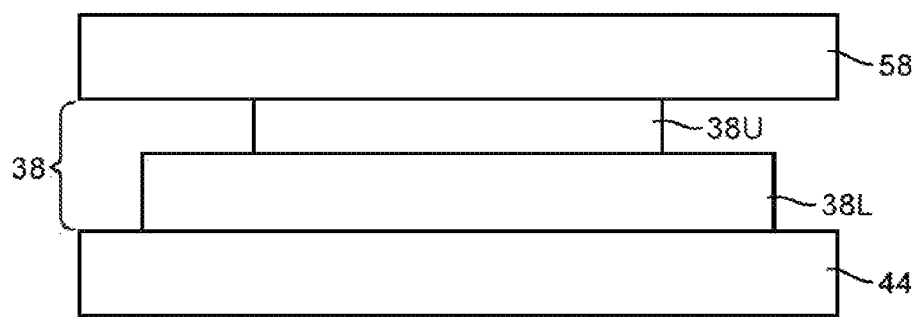

FIG. 42 is a cross-sectional side view of bonding stage equipment being used to bond substrates together using upper and lower layers of adhesive in accordance with an embodiment.

Figure 43:
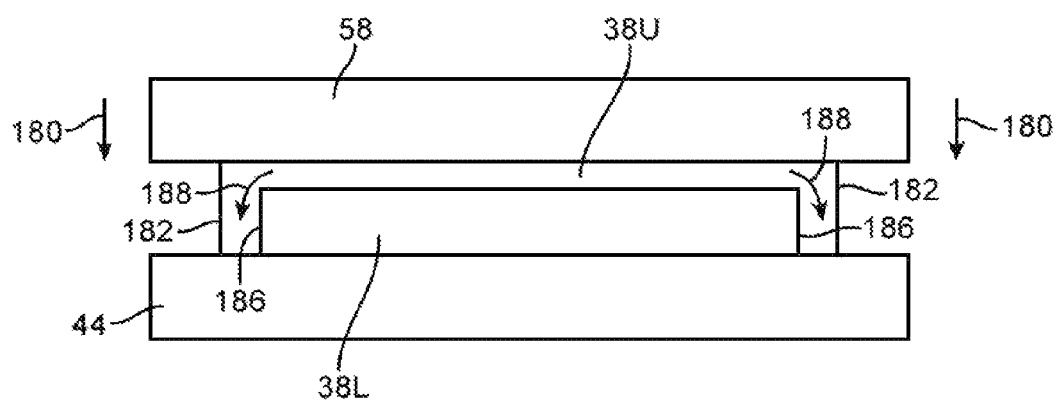

FIG. 43 is a cross-sectional side view of the bonding stage equipment of FIG. 42 after pressing together the substrates and compressing the interposed layer of adhesive until the upper adhesive layer flows outward and covers the edges of the lower adhesive layer in accordance with an embodiment.

Figure 44:
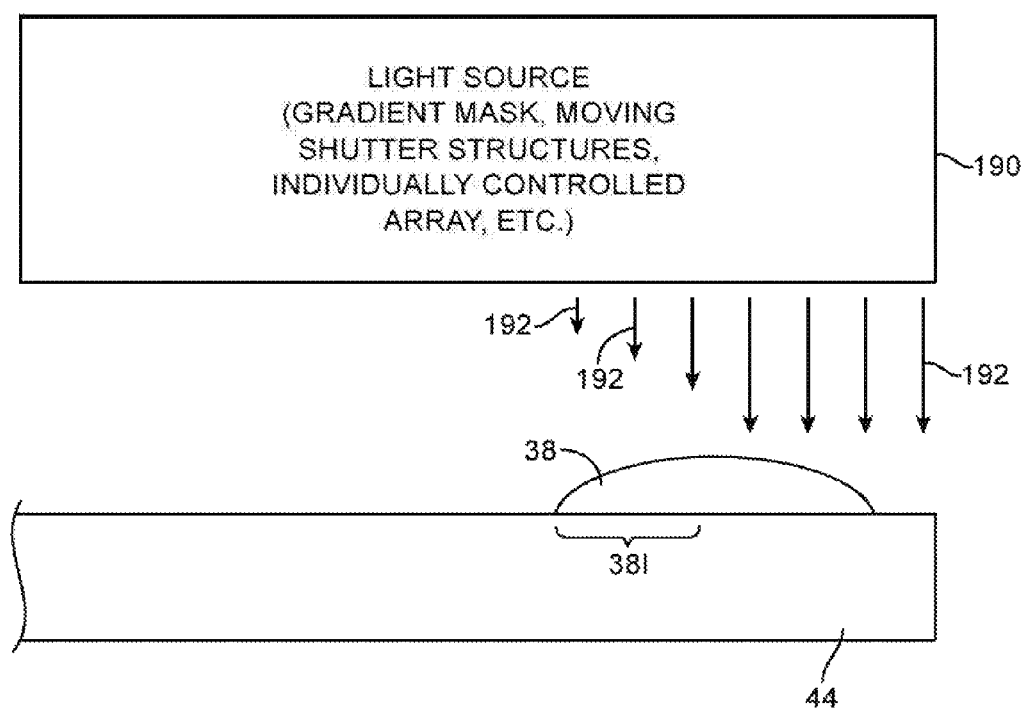

FIG. 44 is a side view of light-based equipment for curing a ring of adhesive on a substrate to form an adhesive dam with a tapered inner edge in accordance with an embodiment.

Figure 45:
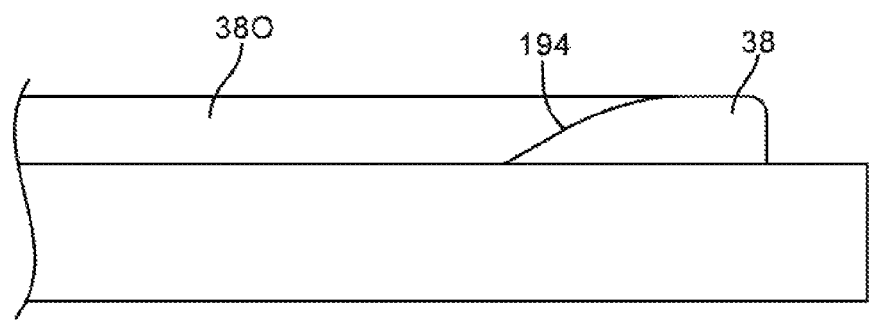

FIG. 45 is a cross-sectional side view of an adhesive dam with a tapered inner edge and an associated laterally confined layer of liquid adhesive in accordance with an embodiment.

Figure 46:
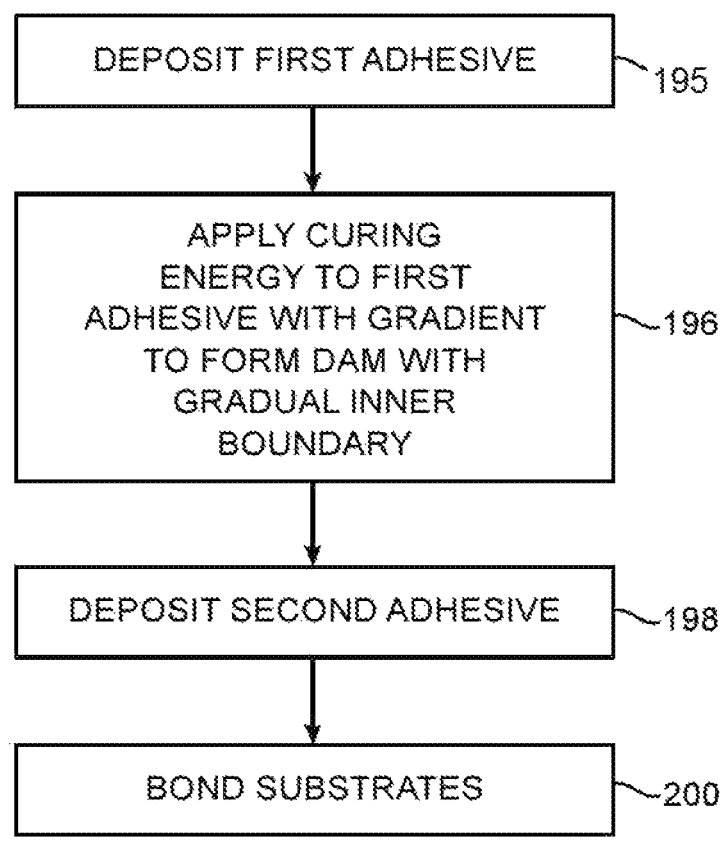

FIG. 46 is a flow chart of illustrative steps involved in forming a structure of the type shown in FIG. 45 in accordance with an embodiment.

Figure 47:
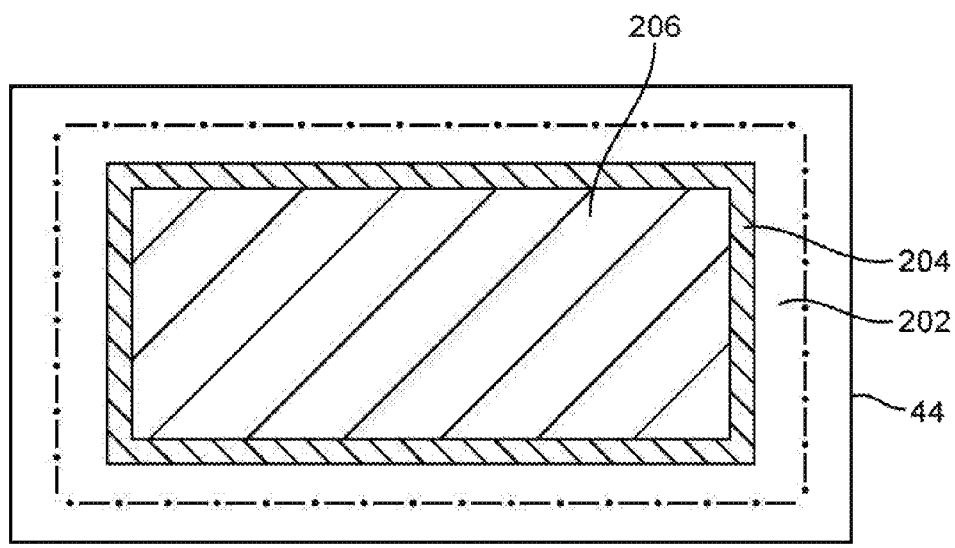

FIG. 47 is a top view of a substrate layer on which a layer of adhesive has been patterned with light of varying intensity to form a smoothly varying edge for an adhesive dam in accordance with an embodiment.

Figure 48:
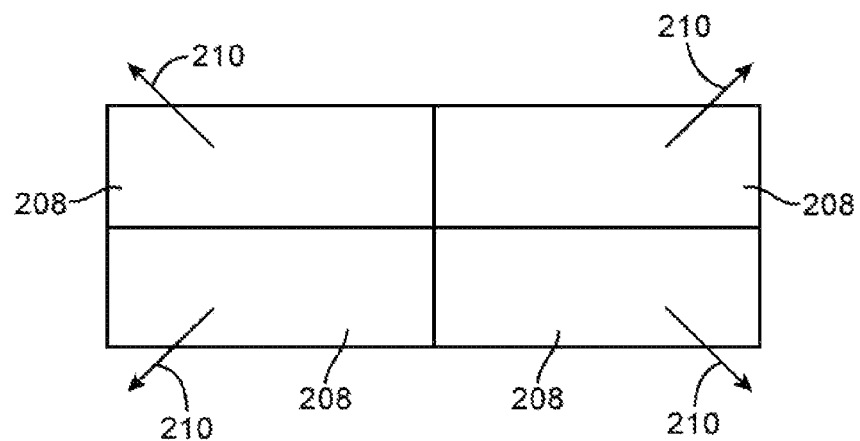

FIG. 48 is a top view of a movable shutter system of the type that may be used in applying light to a layer of adhesive to form an adhesive dam with a tapered edge in accordance with an embodiment.

Figure 49:
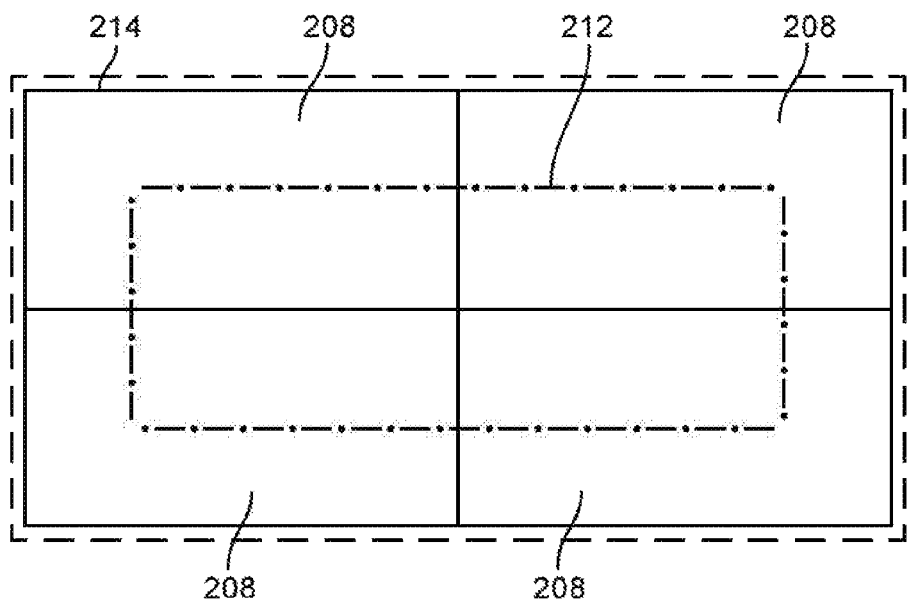

FIG. 49 is a top view of the movable shutter system of FIG. 48 in a configuration in which the shutters have been moved into an expanded configuration in accordance with an embodiment.

DETAILED DESCRIPTION

Adhesive may be used in attaching structures formed from plastic, glass, ceramic, fiber-based composites such as carbon fiber composites and fiberglass, metal, and other structures. These structures may form part of electrical components in an electronic device. As an example, adhesive may be used in coupling together planar substrate layers such as planar layers of glass or plastic that are associated with a display. The substrates that are joined with adhesive in this way may include layers such as a display cover layer, a touch sensor array substrate that is part of a display or that is separate from a display, a thin-film transistor layer, a color filter layer, and/or other substrates associated with a display or electronic device. Arrangements in which adhesive is used in bonding together layers in an electronic device such as layers associated with a display may sometimes be described herein as an example. This is, however, merely illustrative. Any suitable structures may be attached to each other using adhesive if desired.

Figure 1:
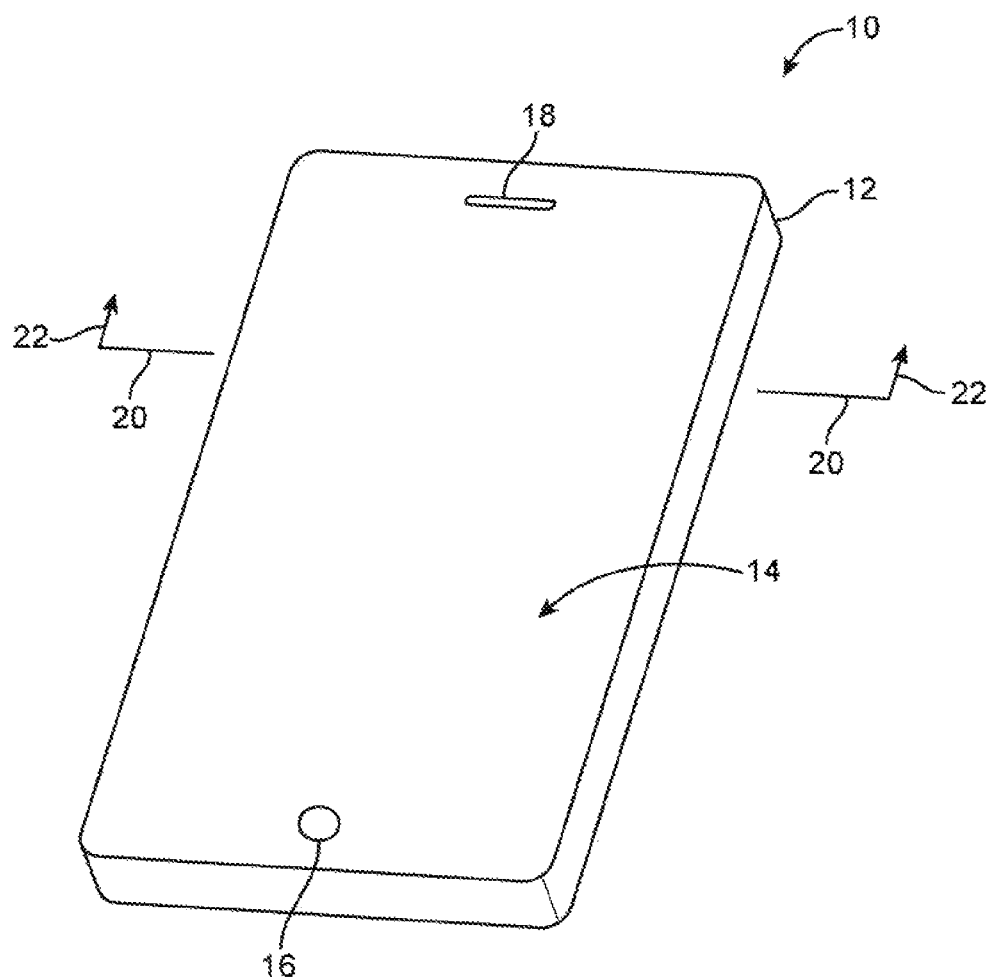
FIG. 1 is a perspective view of an illustrative electronic device of the type that may be provided with structures attached to each other using liquid adhesive in accordance with an embodiment.

An illustrative electronic device having structures such as substrates for a display or other structures that are bonded using adhesive is shown in FIG. 1. Electronic devices such as device 10 of FIG. 1 may be cellular telephones, media players, other handheld portable devices, somewhat smaller portable devices such as wrist-watch devices, pendant devices, or other wearable or miniature devices, gaming equipment, tablet computers, notebook computers, desktop computers, televisions, computer monitors, computers integrated into computer displays, or other electronic equipment.

In the example of FIG. 1, device 10 includes a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. The brightness of display 14 may be adjustable. For example, display 14 may include a backlight unit formed from a light source such as a lamp or light-emitting diodes that can be used to increase or decrease display backlight levels and thereby adjust display brightness. Display 14 may also include organic light-emitting diode pixels or other pixels with adjustable intensities. In this type of display, display brightness can be adjusted by adjusting the intensities of drive signals used to control individual display pixels.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18.

Figure 2:
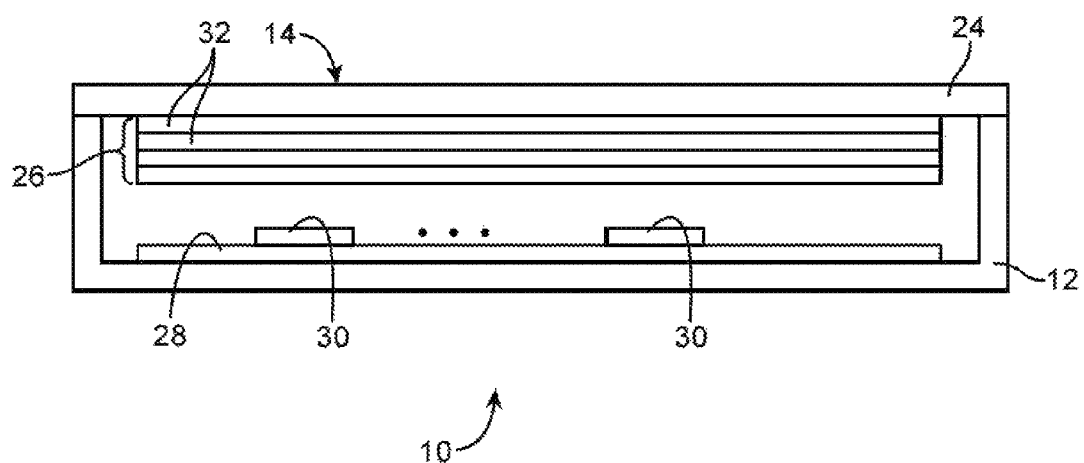
FIG. 2 is a cross-sectional side view of a portion of an electronic device having structures such as layers of material associated with a display that are bonded using adhesive in accordance with an embodiment.

A cross-sectional side view of device 10 taken along line 20 and viewed in direction 22 is shown in FIG. 2. As shown in the illustrative configuration of FIG. 2, device 10 may include one or more printed circuits such as printed circuit 28. Integrated circuits and other electrical components 30 may be mounted on printed circuit 28 and may be interconnected with display module 26. Display module 26 may be a liquid crystal display module, an organic light-emitting diode display, an electrophoretic display module, or a display module using other types of display technology. Display module 26 may contain multiple display layers 32. Display layers 32 may, for example, include polarizer layers, thin-film transistor layers, and color filter array layers. Optional display cover layer 24 may form an additional display layer for display 14. Display cover layer 24 may be formed from a clear layer of glass, a transparent plastic layer, or other transparent member.

Adhesive may be used in assembling the structures of device 10. For example, liquid optically clear adhesive may be interposed between the layers of display 14 such as display cover layer 24 and/or layers 32. The use of optically clear adhesive may allow light from display pixels in display 14 to be viewed by a user of device 10. Other types of adhesive (e.g., adhesive that is not clear) may be used in assembling structures in device 10 if desired. Configurations in which display layers in display 14 are laminated to each other using optically clear adhesive are sometimes described herein as an example.

The adhesive that is used in bonding the structures of device 10 such as display layers in display 14 may be thermally cured (e.g., by applying heat form a hot plate, heated member, heat gun, oven, or other heat source), may be chemically cured (e.g., by exposing the adhesive to catalyst), and/or may be cured by exposure to light such as ultraviolet light or other sources of energy (e.g., electromagnetic energy).

Figure 3:
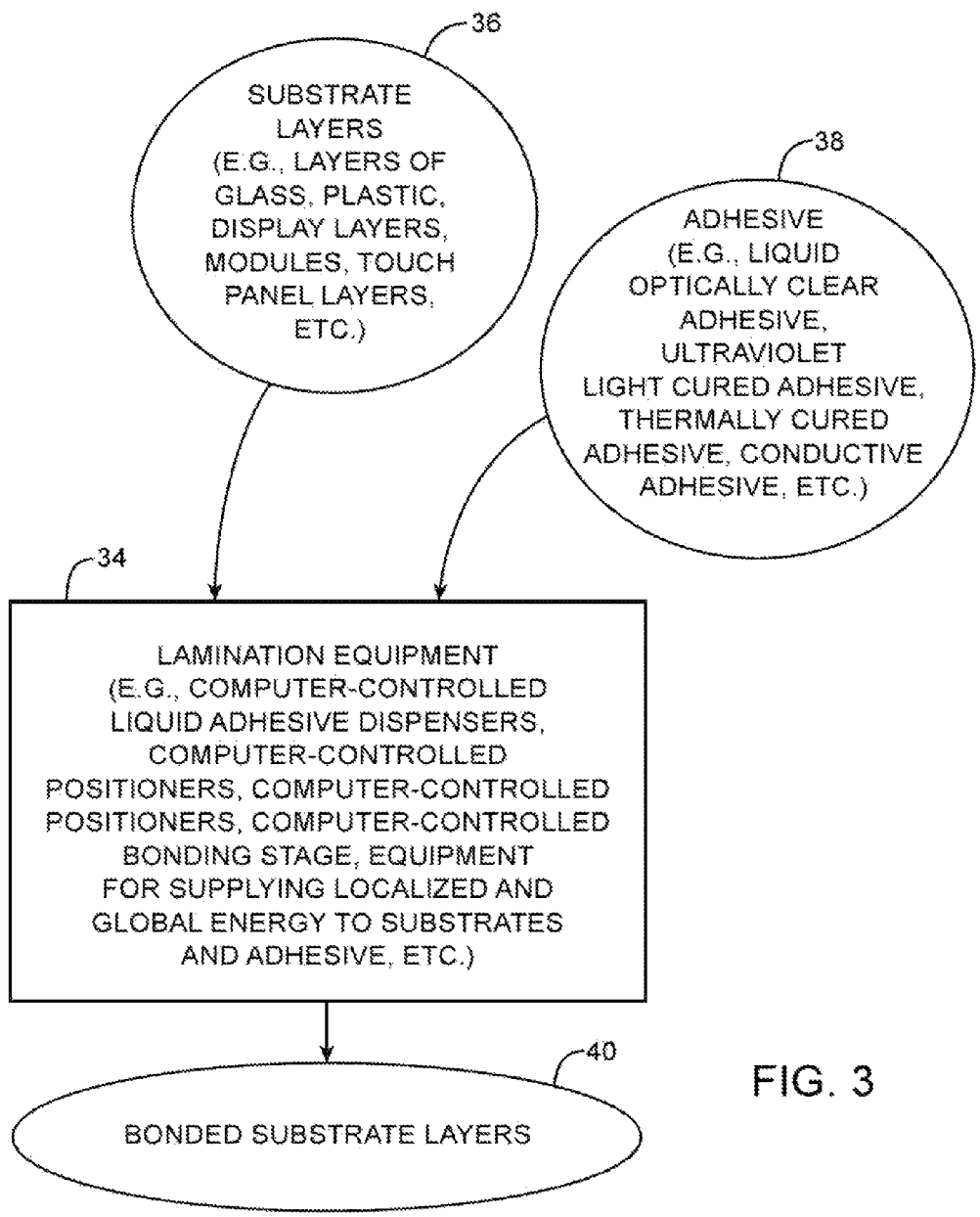
FIG. 3 is a diagram showing how lamination equipment may be used in bonding together structures in an electronic device such as substrate layers in accordance with an embodiment.

FIG. 3 is a system diagram showing how adhesive bonding operations may be performed on the structures of device 10. As shown in FIG. 3, bonding (lamination) equipment 34 may receive structures to be bonded such as substrate layers 36. Substrate layers 36 may include display layers in display 14 such as cover layer 24 and/or display module layers 32 such as a thin-film transistor layer, color filter layer, polarizer layers (e.g., an upper polarizer and/or a lower polarizer), backlight layers, organic-light-emitting diode substrate layers, etc.

Adhesive 38 may be used in attaching substrate layers 36. Adhesive 38 may be liquid adhesive such as liquid optically clear adhesive. Adhesive 38 may be cured by ultraviolet light (i.e., adhesive 38 may be ultraviolet light cured adhesive), may be cured by application of heat (i.e., adhesive 38 may be thermally cured adhesive), and/or may be cured by application of catalyst (as examples). Curing operations may involve full curing to form a strong bond between respective substrate layers and/or partial curing. Partial curing may be used to render adhesive 38 tacky to facilitate assembly operations or may be used to thicken adhesive 38 (e.g., to increase the viscosity of adhesive 38 sufficiently to allow adhesive 38 to form a barrier for liquid adhesive flow or to form a protrusion that facilitates contact between a substrate layer and adhesive 38 at a predefined location). Adhesive curing operations may also be used to form structures such as peripheral adhesive dams that help laterally contain liquid adhesive and thereby prevent the formation of irregular adhesive borders.

Bonding equipment 34 may include computing equipment such as one or more networked computers, stand-alone computing equipment, computing equipment embedded into a bonding tool, positioner, sensor, or other equipment, or other processing and storage circuitry that serves as a controller for bonding operation. The computing equipment may serve as control circuitry that generates control signals for components in equipment 34. The components in bonding equipment 34 may include computer-controlled positioners, shutters for blocking the passage of light, adhesive flow control structures such as computer-controlled valves, fiber positioners in a fiber-based light source, heating equipment for selectively heating adhesive 38, equipment for applying localized and global energy to adhesive 38 (e.g., equipment for applying light, radio-frequency signals, electrostatic magnetic and/or electric fields), liquid catalyst dispensing equipment, computer-controlled adhesive dispensers (e.g., adhesive dispensers whose position is controlled by associated computer-controlled positioners), bonding stage vacuum chucks, upper and lower bonding stage plates for applying force to the upper and lower surfaces of substrates being bonded together with adhesive 38, equipment for controlling adhesive flow, vacuum chamber equipment for creating a vacuum during vacuum lamination operations with adhesive 38, individually controlled light sources and light modulators, and other components.

During adhesive bonding operations involving planar structures such as display substrate layers in display 14, it can be challenging to avoid incorporating voids (e.g., bubbles) within adhesive 38. As an upper substrate is brought into contact with adhesive on a lower substrate, there is an opportunity for voids to be created. In arrangements in which vacuum chamber equipment is not being used, for example, there is a potential for undesired air bubbles to be incorporated into the adhesive when substrates with planar layers of adhesive are being sandwiched together.

Figure 4:
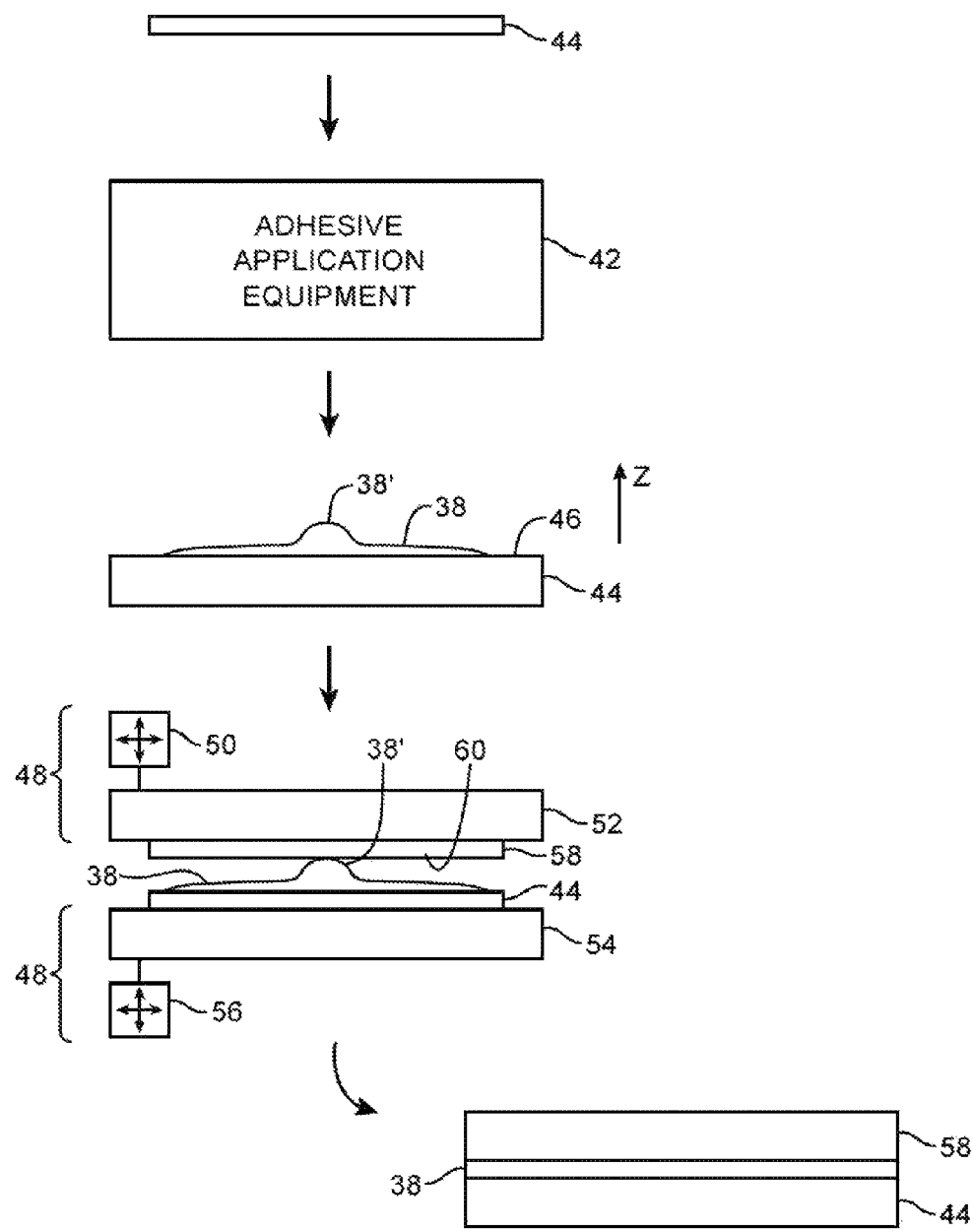
FIG. 4 is a diagram showing how adhesive may be dispensed onto a substrate in a three-dimensional shape to ensure initial contact is made between the adhesive and a substrate at a desirable location for minimizing adhesive voids during substrate bonding in accordance with an embodiment.

The likelihood of void formation can be minimized by creating a protrusion in the adhesive before the substrates are joined. For example, an adhesive protrusion may be formed within the adhesive on the lower substrate. As shown in FIG. 4, for example, adhesive application equipment 42 may be used to apply adhesive 38 to the upper surface of lower substrate 44 so that portion 38' forms a protrusion that protrudes upwards from surface 46 and layer 38 in direction Z.

Bonding equipment 48 (sometimes referred to as lamination equipment) may be used in bonding together upper substrate 58 and lower substrate 44. Bonding equipment 48 may include computer controlled positioners such as positioners 50 and 56. Computer-controlled positioner 50 may be used in controlling upper bonding stage plate 52. Computer-controlled positioner 56 may be used in controlling lower bonding stage plate 54. Positioners 50 and 56 may be used in making 6-axis adjustments to ensure alignment between plates 52 and 54 and thereby ensure alignment between upper substrate 58 and lower substrate 44. Vacuum chucks or other holding mechanisms may be incorporated into plates 52 and 54 to hold substrates 58 and 44 in place. As bonding stage plates 52 and 54 are brought together, adhesive protrusion 38', which is higher than surrounding portions of adhesive 38, makes initial contact with lower surface 60 of upper substrate 58. The position and shape of protrusion 38' ensures that contact will be made between protrusion 38' and upper substrate 58 before other portions of adhesive 38. As substrates 58 and 44 are brought further together to complete the bonding process, adhesive 38 is compressed between substrates 58 and 44. Due to the presence of protrusion 38', the adhesive that is being compressed flows outward from the center of substrates 44 and 58 in a predefined pattern, thereby avoiding void formation. The thinner portions of adhesive 38 that cover substrate 44 may help to pre-wet substrate 44 and thereby ensure even adhesive flow. Protrusion 38' may have the shape of a pyramid, a star, an oval, a square, a double Y, or other suitable shape that ensures satisfactory adhesive coverage over the surface areas of substrates 58 and 44.

As adhesive 38 is compressed in the gap between substrates 58 and 44, peripheral portions of adhesive 38 will move laterally outward from the center of substrates 44 and 58. To ensure that the border of adhesive 38 is well defined, it may be desirable to apply ultraviolet light to the edge of adhesive 38 (e.g., in a scenario in which adhesive 38 is ultraviolet light cured adhesive). By applying the ultraviolet light to the exposed edge of adhesive 38, the exposed edge of adhesive 38 may be cured at a defined location, thereby forming a uniform border (e.g., by preventing excess adhesive leakage along one or more of the four edges of rectangular substrates such as substrates 44 and 58).

Figure 5:
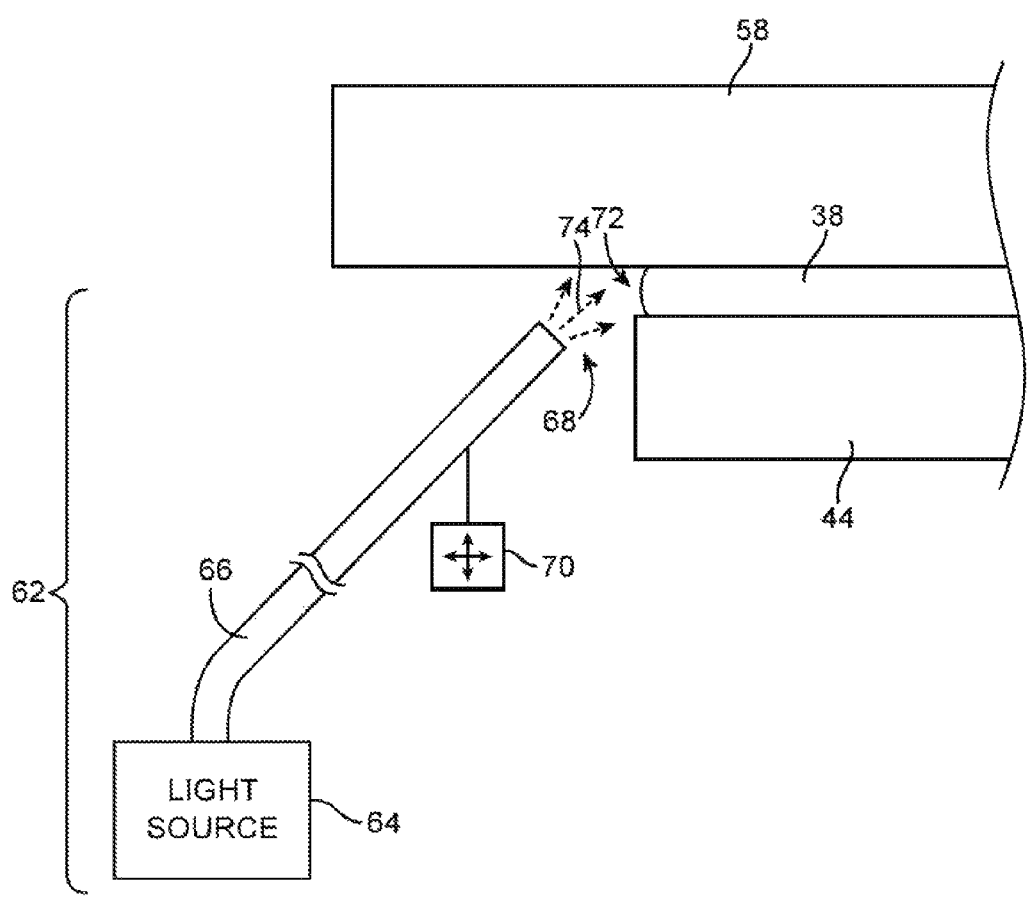
FIG. 5 is a cross-sectional side view of electronic device structures such as electronic device display structures being bonded using adhesive and an associated fiber-based system for applying ultraviolet light to a peripheral edge portion of the adhesive in accordance with an embodiment.

As shown in FIG. 5, fiber-based adhesive curing equipment 62 may be used to cure exposed peripheral edge 72 of adhesive layer 38 between substrates 44 and 58. Fiber-based adhesive curing equipment 62 may include light source 64 and fiber 66. Light source 64 may be an ultraviolet light-emitting diode, an ultraviolet light lamp, a laser, or other source of curing light. Fiber 66 may be a single mode fiber, a multimode fiber, a fiber bundle, a plastic rod, or other light guiding structure for conveying light from light source 64 to edge 72 of adhesive 38. In the example of FIG. 5, fiber structure 66 has an end such as end 68 at which ultraviolet light 74 is emitted. End 68 is preferably sufficiently compact to allow end 68 to be placed adjacent to edge 72.

The position of end 68 may be controlled using computer-controlled positioner 70. For example, positioner 70 may be used to run end 68 along edge 72 of adhesive 38 during curing operations, so that the entire desired length of edge 72 is cured. As adhesive 38 cures along edge 72, it will harden, thereby forming an adhesive dam that prevents excess liquid adhesive leakage. The use of equipment 62 to cure the edge of adhesive 38 can thereby help form a well-defined straight border for adhesive 38.

Figure 6:
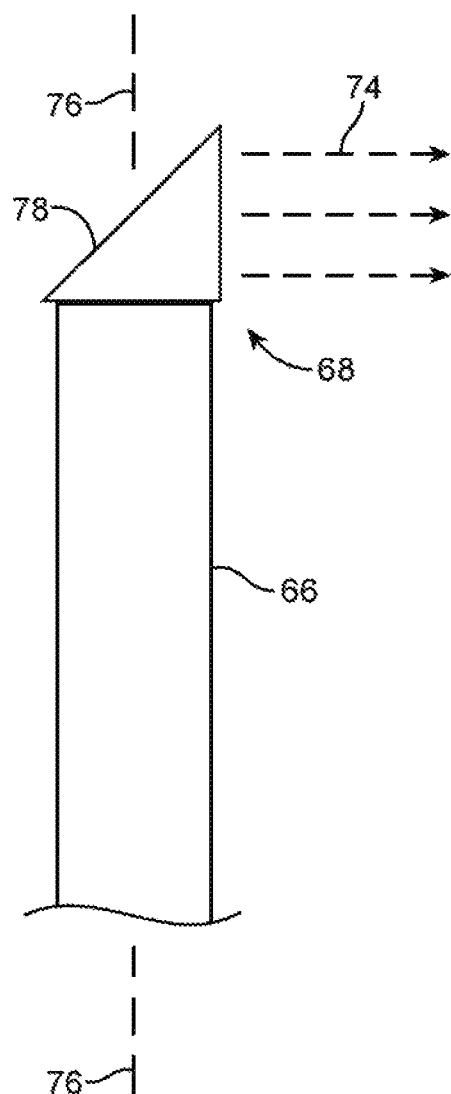
FIG. 6 is a side view of a side-firing fiber with a prism structure for directing light at a right angle with respect to the longitudinal axis of the fiber to facilitate application of ultraviolet light to adhesive in accordance with an embodiment.

If desired, end 68 of fiber 66 may be provided with lenses, prisms, gratings, or other structures to redirect light 74 in a desired direction (e.g., using light reflection, refraction and/or diffraction). FIG. 6 is a cross-sectional side view of fiber 66 in an illustrative configuration in which end 68 of fiber 66 has been provided with a light directing structure 78 such as a prism that directs light 74 at a right angle with respect to longitudinal axis 76 of fiber 66 (i.e., a structure that directs light at a 90° angle to create a side-firing fiber structure). This type of configuration for fiber 66 may help fiber 66 apply ultraviolet light 74 to adhesive 38 in partially assembled structures where access to edge 72 might otherwise be difficult or impossible. In some situations, for example, there may only be tens or hundreds of microns of clearance between adjacent structures. Fiber-based structures may have fibers 66 that are sufficiently narrow to fit within these relatively confined spaces (e.g., spaces with openings for fiber 66 that are less than 300 microns, as an example).

Figure 7:
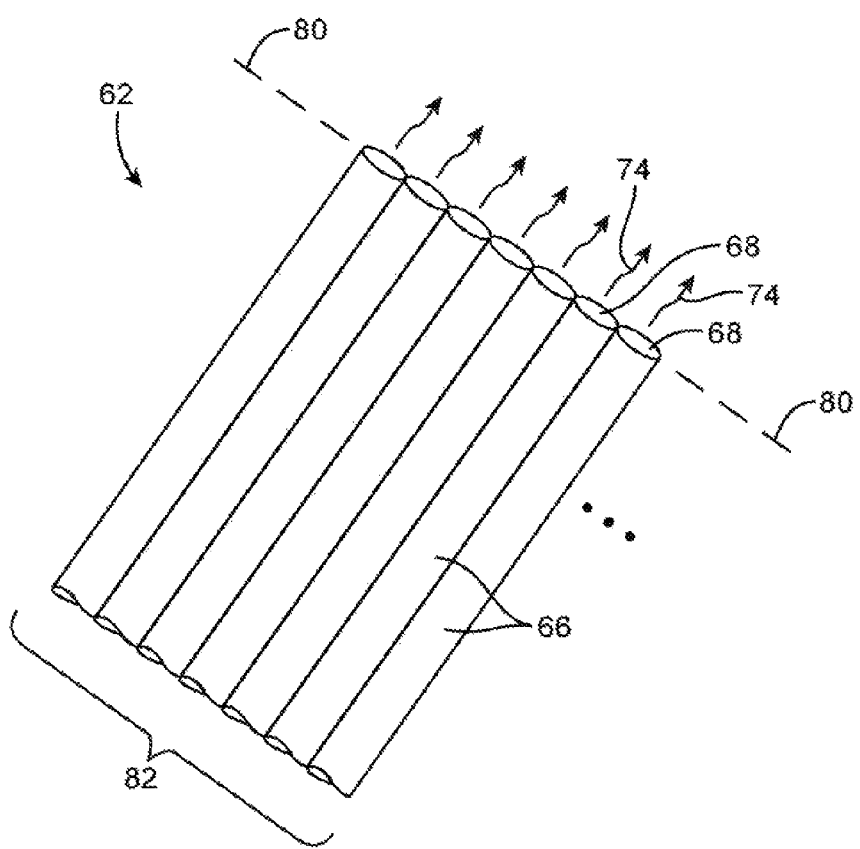
FIG. 7 is a perspective view of a fiber bundle of the type that may be used in applying ultraviolet light to adhesive when assembling structures together for an electronic device in accordance with an embodiment.

As shown in FIG. 7, fiber-based equipment 62 may include a fiber bundle 82 formed from an array of individual fibers 66. Fibers 66 may, for example, be configured so that ends 68 of fibers 66 extend along a straight line such as line 80 (i.e., fibers 66 may be configured to form a strip-shaped bundle). This allows fibers 66 to produce a strip of light 74 to cure an entire edge 72 of adhesive 38 at once.

Figure 8:
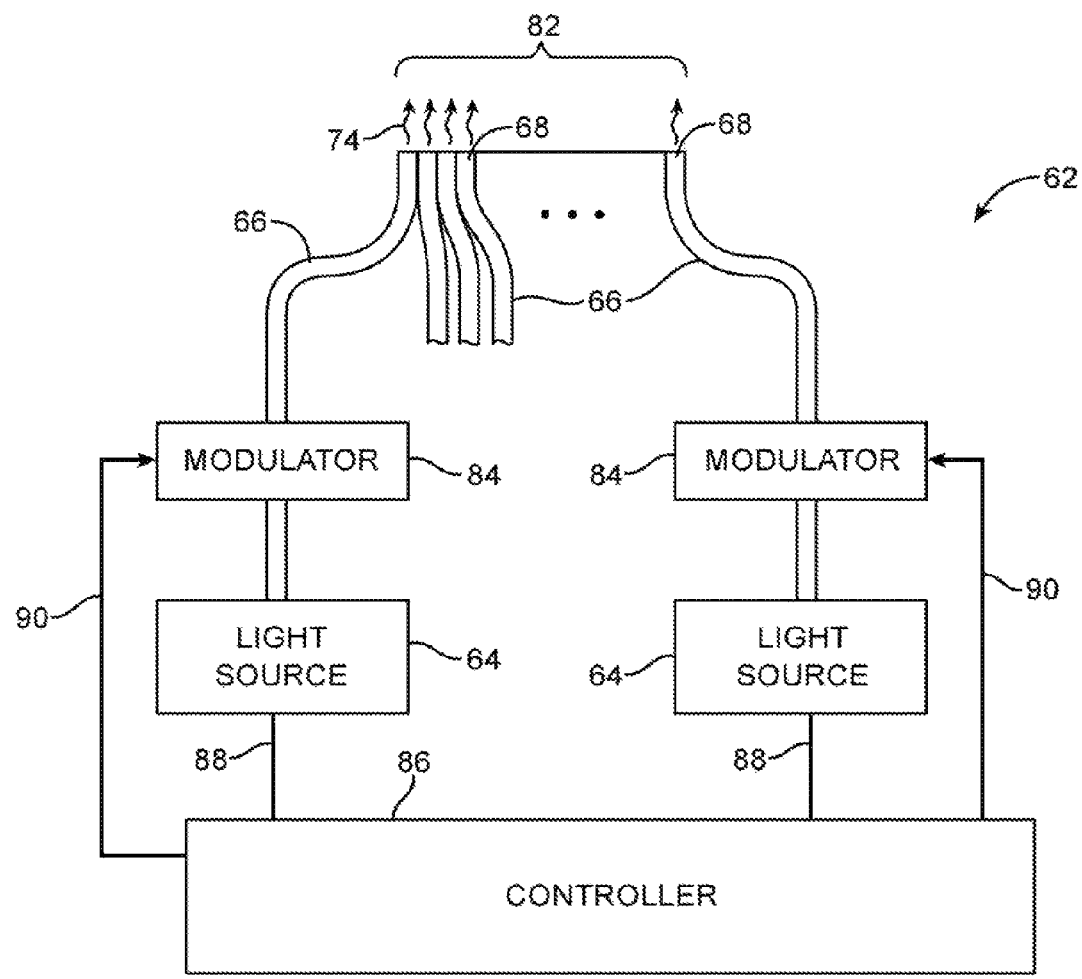
FIG. 8 is a diagram of fiber bundle equipment for applying light to adhesive in accordance with an embodiment.
Figure 9:
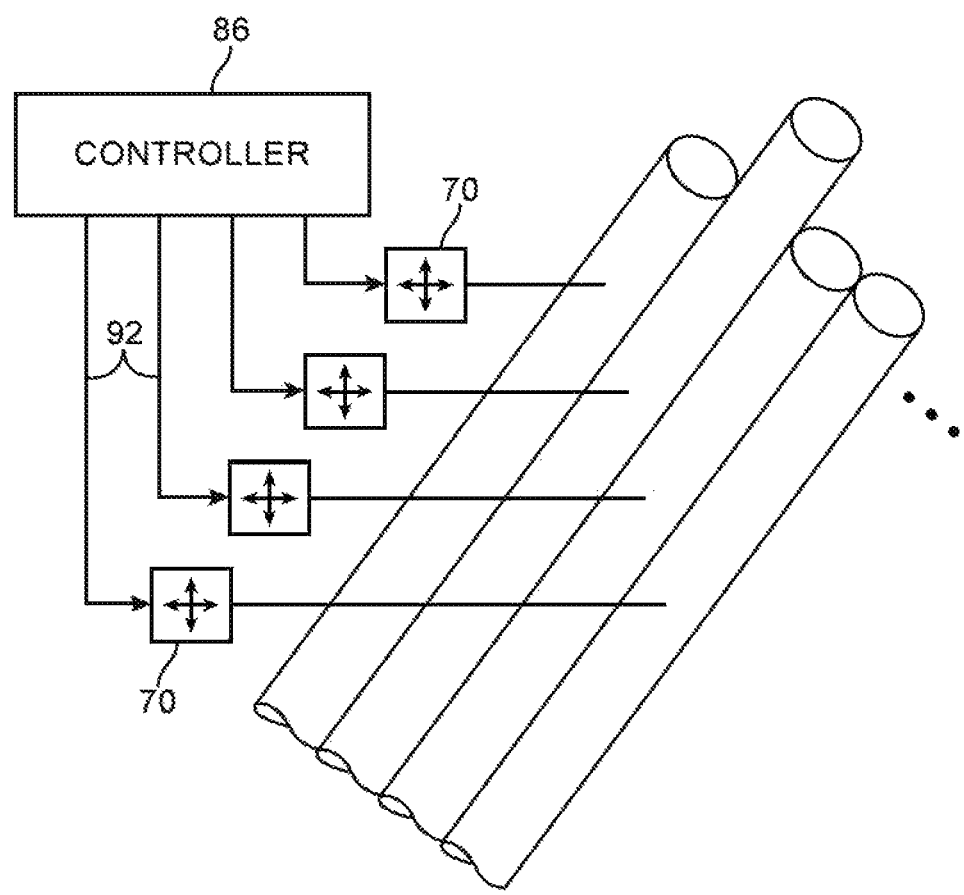
FIG. 9 is a perspective view of a portion of a fiber bundle having individually positioned fibers in accordance with an embodiment.

FIG. 8 shows how fiber-based adhesive curing equipment 62 may be provided with components that allow the amount of light 74 that is provided at each fiber end 68 to be individually controlled. As shown in FIG. 8, fiber bundle 82 contains multiple fibers 66. Each fiber 66 may receive ultraviolet light from a respective light source 64. Optional modulators 84 may be interposed within the paths of fibers 66. Modulators 84 may contain mechanical shutters, liquid crystal shutters, microelectromechanical system (MEMS) attenuators, or other controllable light modulators. During operation, controller 86 may provide controls signals to modulators 84 over paths 90 and/or may provide control signals to light sources 64 over paths 88. The control signals generated by control circuitry such as controller 86 (e.g., computing equipment or other circuitry) may be used in adjusting the magnitude of light 74 that is exiting the end 68 of each fiber 66 in fiber bundle 82. This allows controller 86 to generate a strip of output light 74 with any desired intensity profile. As an example, controller 86 may adjust light 74 so that the intensity of light 74 is evenly distributed across the ends 68 of fibers 66 in fiber bundle 82. If desired, controller 86 may also issue control signals over control paths 92 to positioners such as positioners 70 of FIG. 9 to control the relative position of each fiber 66 in bundle 82.

Figure 10:
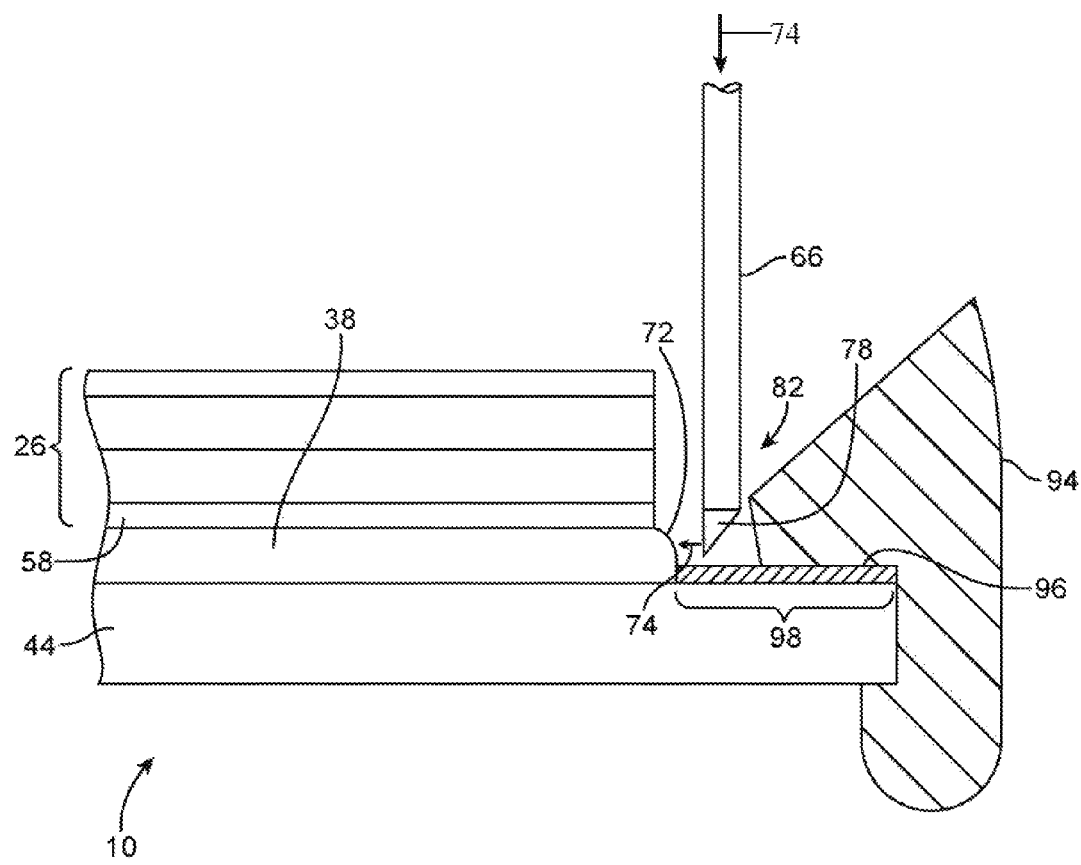
FIG. 10 is a cross-sectional side view of a portion of a display containing adhesive that is being illuminated with fiber-based equipment such as a system having a bundle of side-firing fibers arranged in a strip along the exposed edge of the adhesive in accordance with an embodiment.

FIG. 10 is a cross-sectional side view of a portion of device 10 in which fiber bundle 82 is being used to cure edge 72 of adhesive 38. In the FIG. 10 example, display 10 has a display module such as display module 26. Lowermost substrate layer 58 of display module 26 may be a polymer polarizer layer (as an example). Substrate 44 may be a display cover layer (see, e.g., layer 24 of FIG. 2). Housing structure 94 may be attached to substrate 44 along the edge of substrate 44. Opaque masking material 96 such as a layer of black ink may be formed in an inactive border portion of display 14 (i.e., in a strip-shaped region 98 along the edge of layer 44). Housing structure 94 may be formed from an opaque material such as opaque plastic. Due to the presence of structures such as opaque masking layer 96 and housing structure 94, it can be difficult to shine light 74 on edge 72 of adhesive 38. By using a fiber bundle such as fiber bundle 82 of FIG. 10 in which the ends of each fiber 66 have been provided with respective light redirecting structures 78, fiber bundle 82 may be used to apply ultraviolet light 74 effectively to edge 72 of adhesive 38.

Figure 11:
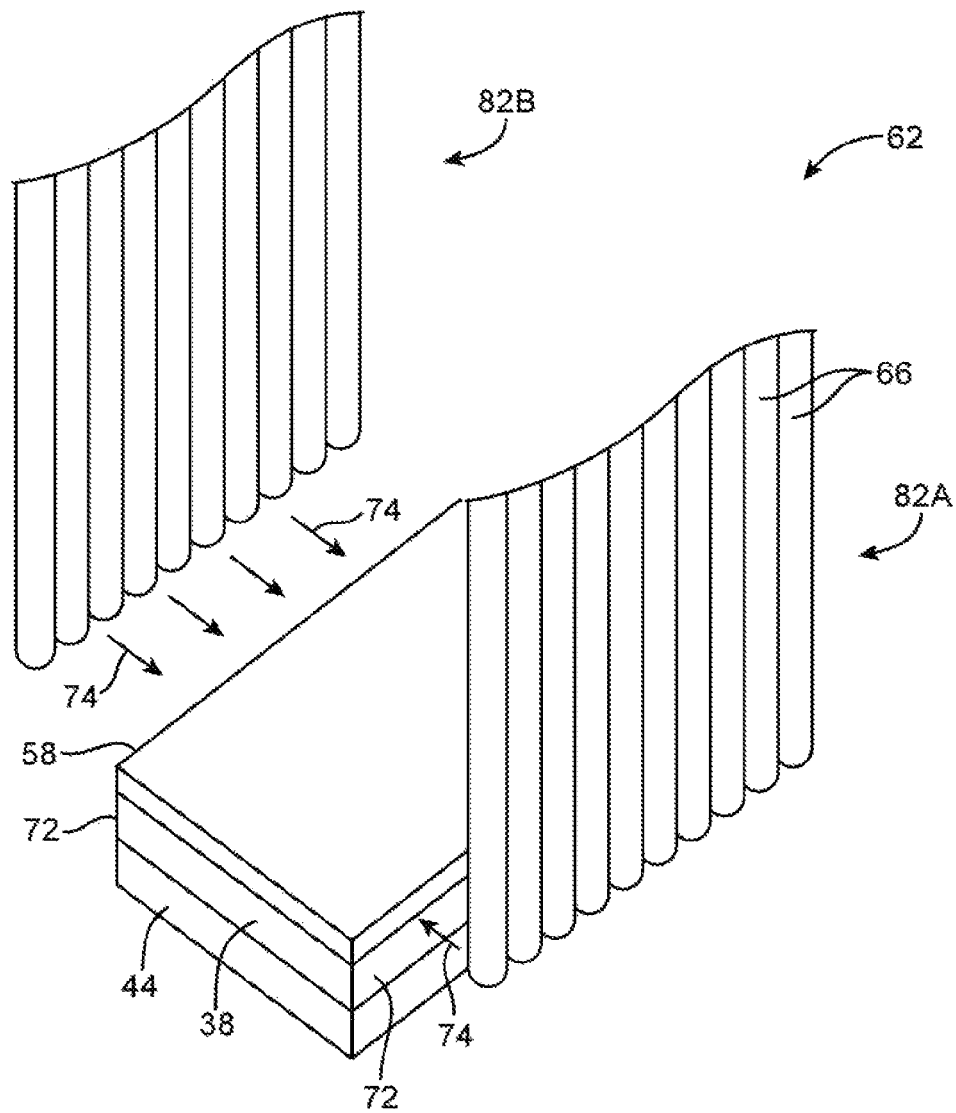
FIG. 11 is a perspective view of an adhesive curing arrangement in which a pair of strip-shaped fiber bundles is being used to illuminate adhesive along opposing edges of a display or other electronic device structure in accordance with an embodiment.

There may be one fiber bundle 82 in fiber-based adhesive curing equipment 62 or there may be two or more fiber bundles in equipment 62. Each fiber bundle may be configured to form a straight edge that emits light 74. In a configuration in which the substrates that are being attached to one another have rectangular outlines with four peripheral edges, it may be desirable to use fiber bundles for curing adhesive 38 along one edge, along two edges, along three edges, or along all four of edges 72. In the illustrative configuration of FIG. 11, equipment 62 has been provided with two fiber bundles 82A and 82B. Fiber bundle 82A may be used in curing one edge 72 of adhesive 38 (i.e., a right-hand edge of a display) and fiber bundle 82B may be used in curing an opposing edge 72 of adhesive 38 (i.e., the opposing left-hand edge of the display). It may be less critical to limit adhesive overflow on the top and bottom edges of the display than on the side edges of the display in this example, because the top and bottom edges may be hidden from view from a user when the display is assembled into device 10, whereas the side edges may be more visible.

Figure 12:
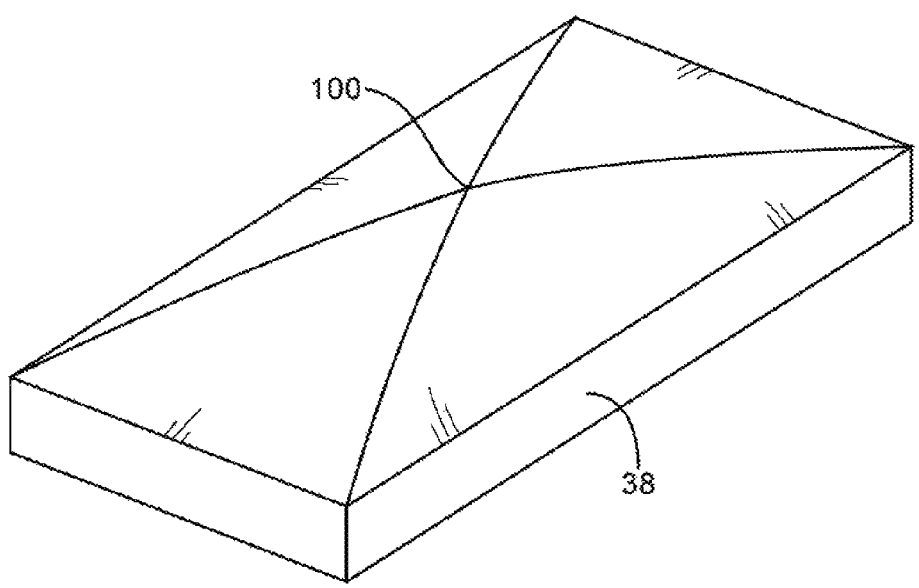
FIG. 12 is a perspective view of a layer of adhesive that has been dispensed on a substrate in a pyramidal shape in accordance with an embodiment.

FIG. 12 is a diagram of an illustrative layer of adhesive 38 having a pyramidal shape to create a central raised point (point 100) to serve as an initial contact point when substrates 58 and 44 are brought together using bonding equipment. Adhesive shapes such as the pyramid shape of adhesive 38 of FIG. 13 help prevent voids from being created during bonding.

Figure 13:
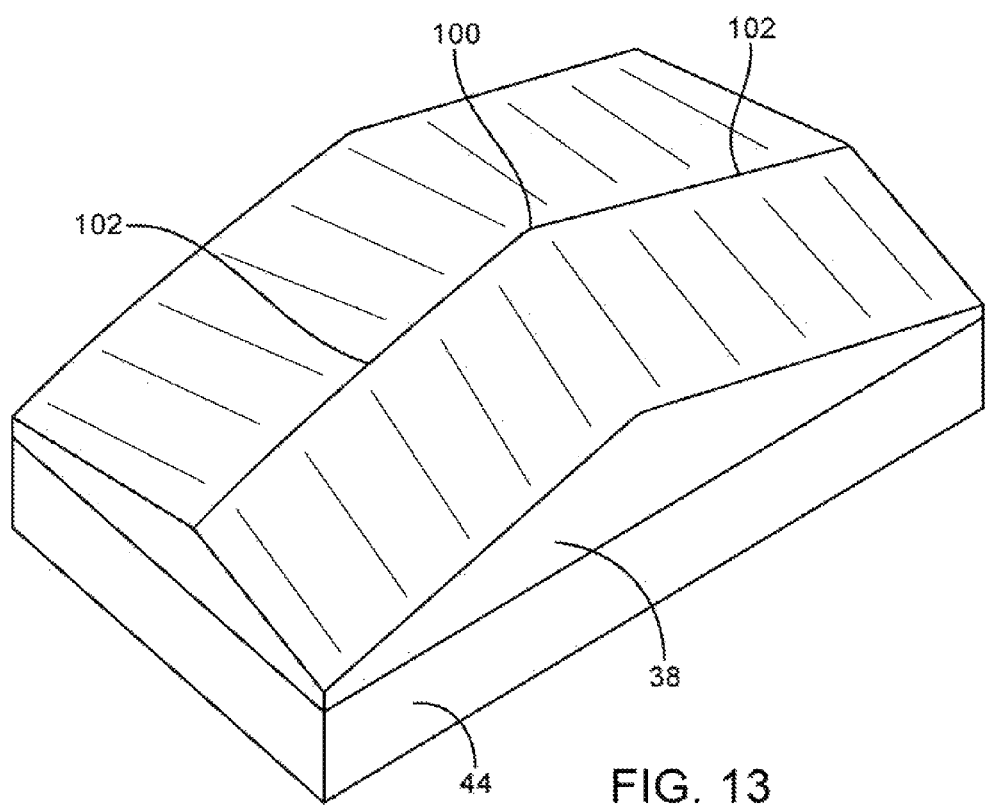
FIG. 13 is a perspective view of a layer of adhesive that has been dispensed on a substrate in a shape that is characterized by a raised ridge with a central peak in accordance with an embodiment.
Figure 13:
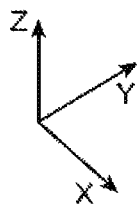

Another illustrative adhesive shape that may be used to prevent void formation is shown in FIG. 13. In the illustrative configuration of FIG. 13, adhesive 38 has been formed with raised ridge 102. The middle of raised ridge 102 along dimension Y is raised more than the ends of ridge 102, creating initial contact point 100.

Shapes such as the shape of FIG. 13 and the shape of FIG. 12 have protruding portions which create predefined contact locations between adhesive 38 and substrate 58 during bonding to prevent voids, as described in connection with protrusion 38' of FIG. 4. These shapes are sometimes referred to as three-dimensional adhesive shapes. In general, any suitable three-dimensional adhesive shape may be used for adhesive 38 to prevent void formation. The examples of FIGS. 4, 12, and 13 are merely illustrative.

Adhesive dispensing equipment for dispensing adhesive 38 in two-dimensional and three-dimensional shapes may be based on slit-coating equipment, screen printing (stencil) equipment, squeegee-based equipment, needle dispensing equipment, jet printing equipment, spin coating equipment, and physical vapor deposition equipment (as examples). Computer-controlled positioners may be used to control the position of the adhesive dispensing equipment relative to substrates 44 and 58 (e.g., to create locally thickened regions of adhesive by locally slowing movement of an adhesive dispensing nozzle, etc.).

Figure 14:
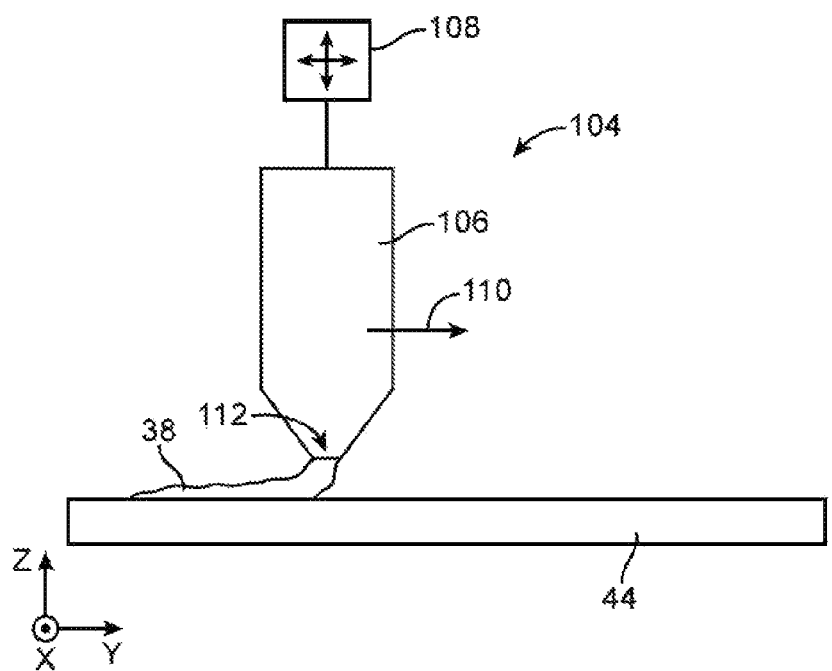
FIG. 14 is a cross-sectional side view of computer-controlled adhesive dispensing equipment having a movable head for dispensing adhesive onto the surface of a substrate in accordance with an embodiment.

A side view of illustrative slit-coating adhesive dispensing equipment 104 is shown in FIG. 14. Equipment 104 includes adhesive dispenser 106. Adhesive dispenser 106 contains adhesive 38. Computer-controlled positioner 108 may be used to move adhesive dispenser 106 relative to substrate 44. Adhesive dispenser 106 has a nozzle with an opening (sometimes referred to as a slit) such as opening 112. As adhesive dispenser 106 is moved in direction 110 by positioner 108, adhesive 38 is dispensed onto the surface of substrate 44 through opening 112.

Figure 15:
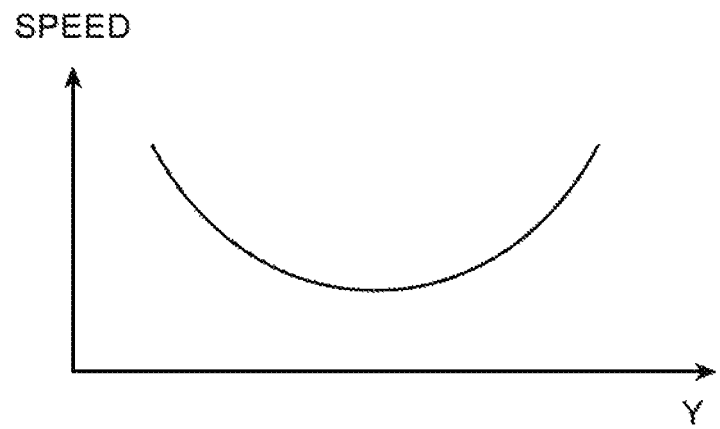
FIG. 15 is a graph showing how the speed of travel of the head of the adhesive dispensing tool of FIG. 14 may be varied as a function of linear position along the length of a substrate in accordance with an embodiment.
Figure 16:
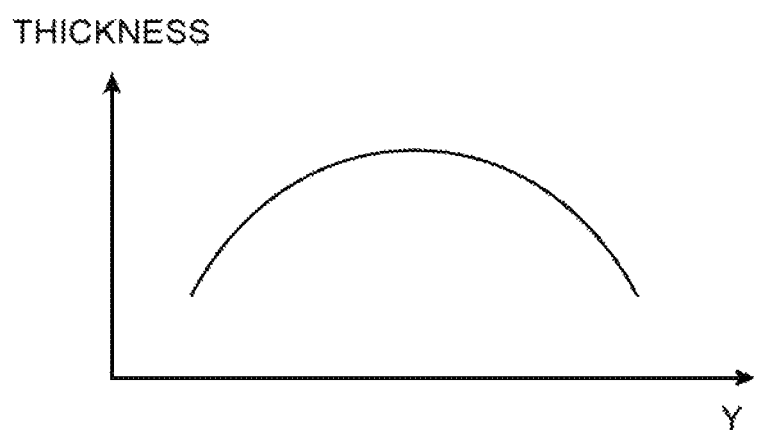
FIG. 16 is a graph showing how the thickness of adhesive dispensed using a speed profile of the type shown in FIG. 15 may vary as a function of position along the length of a substrate in accordance with an embodiment.

As shown in the graph of FIG. 15, a controller may control the movement of opening 112 relative to the surface of substrate 44 by controlling movement of adhesive dispenser 106 with positioner 108 (or by controlling a stage on which substrate 44 is supported) so that the speed of opening 112 along the surface of substrate 44 varies. The speed with which opening 112 travels along the surface of substrate 44 may, for example, be slowed as opening 112 passes over the middle of substrate 44. As shown in FIG. 16 in which dispensed adhesive thickness is plotted as a function of linear position along the surface of substrate 44, varying the speed of opening 112 as shown in FIG. 15 may result in more adhesive 38 being deposited in the middle of substrate 44 than at the ends of substrate 44. By using a nozzle opening 112 for slit dispenser 106 of FIG. 14 that has a shape of the type shown in FIG. 17, an adhesive shape of the type shown in FIG. 13 may be created. As shown in FIG. 17, opening 112 has a triangular upper portion 114 that can be used to create ridge 102 of FIG. 13. During operation, dispenser 106 may be used to move slit opening 112 over substrate 44 so that lower slit edge 112E travels along the surface of substrate 44. In the example of FIG. 18, slit opening 112 has a first triangular portion 112A and a more sharply angled second triangular portion 112B for creating a protruding adhesive structure on the surface of adhesive 38.

Adhesive opening 112 may, if desired, be formed from multiple sub-openings such as openings 112S of FIG. 19. The density of openings 112S (i.e., the number of openings 112S per unit area on the surface of the nozzle), the sizes of openings 112S, and/or the shapes of openings 112S may be varied across opening 112. For example, openings 112S may be configured (in density, size, and/or shape), so that more adhesive 38 is dispensed in the middle of opening 112 (in dimension X) than along the edges of opening 112. This allows openings such as illustrative opening 112 of FIG. 19 to form adhesive shapes with upwardly protruding portions to serve as initial substrate contact points during substrate bonding.

Opening 112 may have openings 112S that are used to dispense individually controlled flows of adhesive. This type of arrangement is shown in FIG. 20. As shown in FIG. 20, adhesive reservoir structure 114 may contain multiple adhesive reservoirs such as reservoirs 114A, 114B, and 114C. Reservoirs 114A, 114B, and 114C may each contain a separate type of adhesive or may dispense the same type of adhesive. For example, reservoirs 114A, 114B, and 114C may contain adhesive 38 of different viscosities, different chemical compositions, etc. Adhesive flow control equipment such as valves 118A, 118B, and 118C may be controlled by an adhesive dispensing equipment controller. For example, valve 118A may be used to control how much adhesive 38 from reservoir 114A flows to nozzle opening 112S-1 via adhesive passageway 116A, valve 118B may be used to control how much adhesive 38 from reservoir 114B flows to nozzle opening 112S-2 via adhesive passageway 116B, and valve 118C may be used to control how much adhesive 38 from reservoir 114C flows to nozzle opening 112S-3 via adhesive passageway 116C. By controlling the flow to each portion of opening 112 separately, the shape of adhesive 38 (e.g., the thickness of adhesive 38 on substrate 44) can be controlled in three dimensions. Openings 112 may be associated with a slit dispenser, a screen in a screen printing tool, a portion of a squeegee, needle dispensing equipment, jet printing equipment, etc.

FIG. 21 is a perspective view of screen printing equipment 120 having screen openings 112S. Openings 112S may have the same density, size, and shape when it is desired to produce a uniform layer of adhesive 38 on substrate 44) or may have different densities, sizes and/or shapes. Computer-controlled positioner 124 may move blade 122 across the surface of the screen in direction 122 to force adhesive 38 through openings 112S. The pattern of openings 112S (density, size, and/or shape) may be selected so that adhesive 38 has a desired two-dimensional or three-dimensional shape (e.g., a shape with a protruding region). As illustrated by the dashed line on blade 122, blade 122 may, if desired, be provided with a shape that facilitates formation of a desired adhesive profile.

FIG. 22 shows how computer-controlled positioner 126 may be used to control the position of an adhesive dispenser such as adhesive dispensing needle 128. One or more needle dispensers such as needle 128 may be used in dispensing adhesive 38 onto the surface of substrate 44. The needles may have different sizes and shapes of openings to help define a desired pattern of deposited adhesive. If desired, adhesive dispensing needles such as needle 128 and other adhesive dispensing equipment may be used to introduce adhesive 38 between a pair of closely spaced substrates (i.e., needle 128 may dispense adhesive 38 into a gap between substrates 44 and 58).

Before bringing substrates 44 and 58 together during bonding, adhesive 38 may be deposited in a pattern on the surface of one or both of substrates 44. In the example of FIG. 23, adhesive 38 has been deposited in a rectangular pattern. In the example of FIG. 24, adhesive 38 has been deposited in an oval pattern. In the FIG. 25 example, a double Y pattern has been used when depositing adhesive 38 on the surface of the substrate. Other patterns for adhesive 38 may be used if desired. The patterns of FIGS. 23, 24, and 25 are merely illustrative.

It may be desirable to deposit multiple layers of adhesive 38. For example, it may be desirable to deposit a first layer of adhesive 38 such as a rectangular layer that covers some or all of substrate 44 to provide an initial wetting of the surface of substrate 44, followed by deposition of a second layer of adhesive 38 to form a desired three-dimensional adhesive shape. The second layer of adhesive 38 may, for example, form protrusion 38' of FIG. 4. FIG. 26 is a top view of substrate 44 in a configuration in which a first layer of adhesive 38-1 has been covered with a second layer of adhesive 38-2. The patterns used for the first and second adhesive layers of FIG. 26 are ovals, but this is merely illustrative. The first and second adhesive layers (and, if desired, subsequent adhesive layers) may have any suitable shapes.

The substrates that are being joined by adhesive 38 in device 10 may be rigid layers or may be flexible. When bonding flexible layers, it may be desirable to use roller-based equipment such as bonding equipment 128 of FIG. 27. In the FIG. 27 configuration, equipment 128 is being used to bond substrate 136 to substrate 138. Substrate 136 has been coated with adhesive layer 38. Substrate 138 may be a rigid substrate such as a layer of glass or plastic. Substrate 136 may be a flexible substrate such as a flexible sheet of polyimide or other flexible polymer sheet. During operation of equipment 128, substrate 138 and substrate 136 may travel in direction 140. Rollers such as rollers 130 may each rotate about a rotational axis 132 in direction 134 to help guide and bond together substrates 136 and 138.

FIG. 28 is a diagram of an illustrative substrate 44 that has been coated with adhesive 38. Light source 142 is being used to produce light 144. Light source 142 may be a lamp or light-emitting diode that emits light 144 such as ultraviolet light. Adhesive 38 of FIG. 28 may be ultraviolet light cured adhesive. Light source 142 may apply light 144 to cure a peripheral edge portion of adhesive 38 and thereby form an adhesive-containing adhesive dam structure.

In the configuration of FIG. 28, a strip of light 144 cures adhesive portion 38B of adhesive 38 as the edge of adhesive 38 flows outward under light 144. Exposure to light 144 will therefore create an adhesive dam that prevents liquid adhesive 38 from flowing further outward past light 144. By patterning light 144 with an appropriate shape (e.g., a rectangular ring), excess flow of adhesive 38 may be prevented (i.e., light 144 may cure adhesive 38B sufficiently to form a rectangular ring-shaped adhesive dam that prevents the remainder of liquid adhesive 38 from flowing past the rectangular ring). In the FIG. 28 example, energy for locally curing adhesive 38 to form cured adhesive barrier 38B along the periphery of adhesive 38 (and along the periphery of display 14 or other structure in which substrate 44 and adhesive 38 are formed) is provided in the form of ultraviolet light. In general, adhesive curing energy may be applied locally and/or globally to adhesive 38 using electrostatic fields (electrical and magnetic), using radio-frequency energy, using light, using conducted or radiated heat, or using other types of energy. The example of FIG. 28 is merely illustrative.

FIG. 29 is a side view of substrate 44 showing how a surface structure such as surface structure 146 may be formed on the surface of substrate 44. Structure 146 may have the shape of a rectangular ring or other shape that serves as an adhesive dam for preventing excess outward movement in direction 148 of adhesive 38. Structure 146 may be formed from a hydrophobic (moisture-repelling) material (as shown in FIG. 29), may be formed from a hydrophilic material, may be formed by depositing and patterning material on the surface of substrate 44, may be formed by surface treatment of the surface of substrate 44 using light, ion bombardment, surface roughening, may be formed by patterning a catalyst onto the surface of substrate 44, or may be formed from other patterned materials on substrate 44.

FIG. 30 is a cross-sectional side view of substrates 44 and 58 in a configuration in which bonding stage 120 has been provided with structures 150 on plates 52 and/or 54. Structures 150 may be used to provide localized energy to adhesive 38 (e.g., static electric fields, static magnetic fields, radio-frequency signals, heat, etc.). For example, structures 150 may be metal electrodes for applying an electrostatic field that causes adhesive 38 to protrude sufficiently to form protrusion 38' before plates 52 and 54 of bonding stage equipment 48 press upper substrate 58 downwards in direction 152 against lower substrate 44. The energy that is applied to the localized portion of adhesive layer 38 may adjust the viscosity of layer 38, the amount of curing (polymer cross-linking) in layer 38, the temperature of layer 38, and other physical parameters that may affect the point of contact between layer 38 and the way in which layer 38 flows and coats the surfaces of substrates 44 and 58. Structures such as structures 150 may also be used in applying energy globally (e.g., to all of the surfaces of substrates 44 and/or 58).

FIG. 31 is a flow chart of illustrative steps involved in bonding substrates 44 and 58 using localized energy deposition operations with structures such as structures 150 of bonding stage equipment 48 of FIG. 30. At step 154, substrates 44 and/or 58 may be subjected to surface treatment (e.g., cleaning). Adhesive 38 may then be deposited to the surface of substrate 44, the surface of substrate 58, or to the surfaces of both substrates 44 and 58. Adhesive 38 may be applied using a nozzle or other adhesive dispenser in one or more layers using computer-controlled adhesive dispenser equipment.

At step 156, energy may be locally applied to deposited adhesive 38 as described in connection with FIG. 30. For example, light, heat, or static or dynamic electromagnetic signals, may be applied to the boundary of adhesive 38 to form an adhesive dam from portions of adhesive 38 and thereby laterally confine adhesive 38 during bonding. If desired, the localized surface treatments and/or structures such as structures 146 of FIG. 29 may be used to laterally confine adhesive 38. Localized energy may also be applied to create adhesive protrusions to serve as predefined substrate contact points during substrate bonding.

At step 158, substrates 58 and 44 may be bonded together using bonding stage equipment 48. If desired, structures 150 or other structures may be used to apply localized energy to adhesive 38 as part of the bonding process (e.g., to help form protrusion 38' by electrostatic attraction, etc.).

Light masking equipment such as equipment 160 of FIG. 32 may be used in defining a pattern of applied light during precuring operations such as the operations of step 156 and/or during bonding operations such as the operations of step 158 of FIG. 31. As shown in FIG. 32, equipment 160 may include a light source such as light source 162. Light source 162 may be an ultraviolet light source such as an ultraviolet lamp, ultraviolet light-emitting diode source, or ultraviolet laser. Light source 162 may provide uniform ultraviolet light 166 to mask 164. Mask 164 contains transparent and opaque regions and, if desired, regions with a gradient in density (e.g., graded density areas that vary from dark to light across a range of grey tones). The graded density regions may include continuous zones of gray or may contain discrete clear and dark regions with varying densities to create a transmission gradient. In the example of FIG. 32, mask 164 has a central portion that is more opaque than its edge portions, so transmitted light 166C in the center of mask 164 is less bright than transmitted light 166E near the edge of mask 164. A transmission gradient (i.e., a mask opacity gradient) may be provided in mask 164 between the edge and center regions, so that transmitted light 166M that lies between center light 166C and edge light 166E has an intensity that is greater than the light intensity of transmitted light 166C and that is less than the intensity of transmitted light 166E.

By using a mask such as mask 164 of FIG. 32, adhesive 38 may be exposed to desired local and/or global patterns of light 166. The applied light may be used in modifying the properties of adhesive 38 in a desired pattern (e.g., by curing and thereby cross-linking the polymer of layer 38 to change its viscosity, etc.).

A graph showing how the density of mask 164 may vary as a function of distance R from its center towards its edge is shown in FIG. 33. Solid line 168 corresponds to a pattern in which the edge regions of adhesive 38 are being heavily exposed to ultraviolet light (e.g., to create an adhesive dam by curing the outer periphery of adhesive 38) whereas the central portion of adhesive 38 is being left unexposed (e.g., to ensure low viscosity so that adhesive 38 can flow over the surface of substrate 44 satisfactorily). Dashed line 170 is an illustrative mask gradient that may be used where a more gradual transition between exposed and unexposed portions of adhesive 38 is desired.

Adhesive 38 may be deposited in one or more layers. As an example, adhesive 38 may include an upper layer such a layer 38A and a lower layer such as layer 38B, as shown in FIG. 34. The properties of each sublayer of adhesive that is used in bonding substrates 44 and 58 together may be tailored to accommodate different bonding requirements. For example, in a configuration in which upper substrate 58 is a display cover layer formed from a hard material such as glass and in which lower substrate 44 is a relatively soft polymer layer such as an upper polarizer in a liquid crystal display module, it may be desirable to form adhesive layer 38A of a material that cures to a harder state than that of adhesive layer 38B. When cured, adhesive layer 38A in this type of configuration will be compatible with adjacent hard layer 58 (e.g., glass) and adhesive layer 38B will be compatible with adjacent softer layer 44 (e.g., plastic). By choosing adhesives that match adjacent substrate layers, delamination of adhesive and bond failures can be minimized. In the configuration of FIG. 35, three layers of adhesive 38 have been provided. Layer 38C in the FIG. 35 configuration may serve as an interface between layers 38A and 38B (e.g., layer 38C may be formed from a material that forms satisfactory bonds with both layer 38A and layer 38B).

FIG. 36 is a flow chart of illustrative steps involved in bonding substrates 44 and 58 using one or more layers of adhesive 38. At step 172, adhesive application equipment may be used to dispense a layer of adhesive 38 (e.g., by applying adhesive to substrate 44 and/or substrate 58). The layer of deposited adhesive may be applied globally and/or may be patterned using slit dispensing, needle dispensing, squeegee dispensing, jet dispensing, dispensing techniques with individually controlled nozzle openings, adhesive deposition techniques using one or more passes of a dispensing head across the surface of a substrate, adhesive deposition techniques involving nozzle speed and/or flow control adjustment to adjust adhesive thickness, etc.

At step 174, energy may be locally and/or globally applied to the deposited adhesive 38. For example, light, electrostatic fields, radio-frequency signals, heat, or other forms of energy may be applied using masks, scanning stages, lenses, waveguides, electrodes, etc. Catalyst may also be locally and/or globally applied. If more layers are to be applied, processing may loop back to step 172, as illustrated schematically by line 176.

Once all desired layers of adhesive 38 have been deposited, processing may proceed to step 178. During the operations of step 178, bonding stages 48 may be used to complete the bonding process by pressing substrates 58 and 44 together. Local and/or global energy may be applied to adhesive 38 to help form well defined adhesive borders, to facilitate curing, etc.

FIG. 37 is a top view of an illustrative substrate 44 on which a layer of adhesive 38 has been deposited. By applying energy in the form of ultraviolet light or by otherwise creating adhesive flow barrier 38R, outward adhesive flow may be controlled and a well-defined rectangular border for adhesive 38 may be created. Region 38C may contain protruding adhesive 38C for forming an initial contact point with upper substrate 58. Region 38C may be created using localized application of energy, using multiple passes of adhesive application equipment 42 to deposit an upper adhesive layer on a lower adhesive layer, or by using other application techniques for dispensing adhesive 38 in a three-dimensional pattern.

In an illustrative two-pass configuration, adhesive application equipment 42 (FIG. 4) makes a first pass to deposit blanket lower adhesive layer 38BL on substrate 44 (FIG. 38). Adhesive application equipment 42 (FIG. 4) may then make a second pass to deposit patterned adhesive 38PT. During each pass of adhesive application equipment 42, computer-controlled positioning equipment may move an adhesive dispensing nozzle such as nozzle 106 across the surface of substrate 44 (while optionally varying nozzle speed to locally thicken the adhesive), may use a screen printing tool, may use a jet printer, may use a squeegee, may use needle adhesive dispensing equipment, etc.

As shown in FIG. 40 adhesive 38 may be deposited in the form of two layers such as lower adhesive layer 38L and upper adhesive layer 38U. Upper adhesive layer 38U may have a footprint that lies within the footprint of lower adhesive layer 38L (when viewed in direction 180). Adhesive 38L may be more viscous than adhesive 38U. The pattern of adhesive 38U may be defined by application of a rectangle of ultraviolet light, use of adhesive dispensing equipment that creates a rectangular pattern for adhesive 38L, by depositing adhesive using a rectangular adhesive dam, or using other adhesive patterning techniques. During bonding of upper substrate 58 to lower substrate 44, upper substrate 58 may be pressed downwards in direction 180. This may cause upper adhesive 38U to flow outwards in directions 184 until each of the four peripheral edges 182 of upper adhesive 38U are aligned with each of the four peripheral edges 186 of adhesive layer 38L. Surface tension may help prevent adhesive 38U from overflowing edges 186, so that the final footprints of upper layer 38U and lower layer 38L will match.

In the illustrative configuration of FIGS. 42 and 43, adhesive 38U is initially deposited so that the outline of adhesive 38U lies within the outline of adhesive 38L (FIG. 42). When upper substrate 58 is pressed downwards in direction 180 during bonding, adhesive 38U flows outwards and downwards in directions 188 so that edges 186 of lower adhesive layer 38L are covered by portions of upper adhesive layer 38U. When bonding is complete, edges 182 of upper adhesive layer 38U will lie outside of edges 186 of lower adhesive layer. This may cause upper adhesive layer 38U to have a larger footprint than the footprint of lower adhesive layer 38L (i.e., the footprint of upper adhesive layer 38U will overlap the footprint of lower adhesive layer 38L). If desired, ultraviolet light may be applied to the edge of adhesive 38U to create a well-defined border for adhesive 38U. Adhesives 38U and 38L may be selected to ensure compatibility with adjacent substrates 58 and 44, respectively.

FIG. 44 is a system diagram of light-based equipment that produces adhesive dam structures with smoothly varying edges. As shown in FIG. 44, light source 190 may produce light 192. Light source 190 may be an ultraviolet lamp, an ultraviolet laser, an ultraviolet light-emitting diode source, or other light source for producing light 192. Light source 190 may contain an array of individually controlled light producing elements or other structures for producing a gradually changing light intensity pattern in emitted light 192. For example, light source 190 may contain a halftone mask (e.g., a mask using pixilated metal patterns), may contain a gradient mask with continuously varying opacity, may contain an array of individually controlled light producing cells, may contain an array of individually controlled light modulators, may contain shutters, or may contain other structures for varying the intensity of emitted light 192 as a function of lateral position across the surface of substrate 44.

Adhesive 38 may be used to form an adhesive dam. In areas of adhesive 38 that are exposed to the full strength of light 192, adhesive 38 will cure to form a rigid dam structure (e.g., in the shape of a rectangular ring). To avoid creating an unsightly line along the inner edge of the adhesive dam (where the adhesive dam is joined by liquid adhesive), the intensity of light 192 may be gradually tapered off. For example, light 192 may be decreased in intensity as a function of increasing distance towards the center of substrate 44, thereby creating a gradient in light intensity 192 for inner peripheral edge region 381 of adhesive ring 38. As shown in the cross-sectional side view of FIG. 45, liquid adhesive 380 may be deposited in the center of the adhesive dam formed by adhesive 38 following exposure of adhesive 38 to light 192. Inner edge 194 of the adhesive dam formed from adhesive 38 has a tapered shape with a smoothly varying height, rather than a sharp vertical wall shape, so adhesive 380 forms a gradual interface with adhesive dam 38 and the visibility of edge 194 of adhesive dam 38 is reduced sufficiently to be unnoticeable to a user.

Illustrative steps involved in forming adhesive dams with gradually tapered inner edges to reduce edge visibility are shown in FIG. 46.

At step 195, adhesive 38 is deposited in the shape of an adhesive dam. For example, when it is desired to bond two rectangular substrates such as two display layers in display 14 of device 10, a bead of adhesive 38 may be dispensed in the shape of a rectangular ring running around the rectangular periphery of the display using a needle dispenser or other adhesive dispenser.

At step 196, light 192 with an intensity gradient for forming a tapered inner dam surface may be applied to the deposited adhesive. For example, light 192 may be applied to the deposited rectangular ring of adhesive with inwardly decreasing intensity so that the inner edge of the adhesive dam is cured with a correspondingly decreasing gradient.

At step 198, liquid adhesive is deposited within the center of the rectangular ring-shaped adhesive dam formed from the cured portions of adhesive 38. Because of the gradient in light intensity used for the curing light applied to adhesive dam 38, the inner peripheral surface of the rectangular ring-shaped adhesive dam has an edge that is not abrupt (e.g., an edge with a tapered thickness). After substrates 58 and 44 are bonded together, the non-abrupt nature of the interface between the adhesive dam and the liquid adhesive that is contained by the dam (i.e., the formation of an inner edge for the adhesive dam that is less abrupt than the outer edge) will ensure that the inner edge of the adhesive dam is not readily visible.

FIG. 47 is a top view of a system in which movable shutters have been used to form an exposure gradient when curing a rectangular adhesive dam to form an adhesive dam with a tapered inner edge. As shown in FIG. 47, adhesive on substrate 44 includes an adhesive dam formed from outer rectangular ring portion 202 (which is more heavily cured) and inner ring portion 204 (which is less heavily cured and is therefore tapered or otherwise forms an inner edge that is not abrupt). Adhesive 206 fills the rectangular interior of the adhesive dam. Due to the lower exposure of adhesive ring 204 relative to adhesive ring 202 and the resulting gradient formed in the inner edge of the adhesive ring, the adhesive ring does not form a sharp interface with adhesive 206. The example of FIG. 47 includes an outer ring that has been exposed to a first amount of curing light and an inner ring that has been exposed to a second amount of curing light that is less than the first amount of curing light. Configurations in which an adhesive dam has three or more different amounts of exposure or continuously varying levels of exposure may be used if desired.

The exposure variations of the adhesive dam of FIG. 47 may be achieved using a rectangular shutter with an adjustable outer periphery. This type of arrangement is shown in FIGS. 48 and 49. FIG. 48 shows how a rectangular shutter may have a rectangular outline that has been adjusted to form a first footprint. The shutter of FIG. 48 has four movable blades 208. Blades 208 may be formed from an opaque material such as metal that blocks ultraviolet light. When it is desired to change the size of the shutter, blades 208 may be moved outward in directions 210. Blades 208 overlap in the center of the shutter, so that the center of the shutter is never opened (in this example).

FIG. 49 is a top view of the rectangular shutter of FIG. 48 following expansion of the size of the shutter from initial size 212 (i.e., an outline produced when shutter blades 208 are in the position of FIG. 48) to final size 214. Using a rectangular shutter with an adjustable size, rectangular ring-shaped adhesive dams with inner edges of the type described in connection with FIG. 47 may be formed. During exposure of the adhesive of the adhesive dam to ultraviolet light, the size of the rectangular shutter may be adjusted in steps or continuously, thereby exposing the inner edge of the adhesive dam to light with a gradient in intensity and creating a cured inner edge to the adhesive dam with a tapered shape or other non-abrupt shape.

The foregoing is merely illustrative and various modifications can be made by those skilled in the art without departing from the scope and spirit of the described embodiments. The foregoing embodiments may be implemented individually or in any combination.

What is claimed is:

1. A method for bonding substrates, comprising:
applying liquid adhesive to at least one of the substrates;
applying ultraviolet light to an edge of the liquid adhesive using fiber-based equipment, wherein the fiber-based equipment includes a fiber bundle containing a strip of fibers, wherein applying the ultraviolet light comprises applying the ultraviolet light using the strip of fibers, wherein each fiber in the fiber bundle emits light, and wherein a light modulator is interposed within the path of each fiber; and
with a controller, sending control signals to the light modulator associated with each fiber to individually adjust a magnitude of light emitted by each fiber.

2. The method defined in claim 1 wherein the substrates comprise display substrates for an electronic device display and wherein applying the adhesive comprises applying the adhesive to at least one of the display substrates.

3. The method defined in claim 2 wherein the display substrates include a polarizer layer and wherein applying the adhesive comprises applying the adhesive to the polarizer layer.

4. The method defined in claim 2 wherein the display substrates include a display cover glass layer and wherein applying the adhesive comprises applying the adhesive to the display cover glass layer.

5. The method defined in claim 1 wherein applying ultraviolet light comprises applying ultraviolet light to the fiber bundle using a plurality of light-emitting diodes.

6. The method defined in claim 5, wherein each light-emitting diode is aligned with a respective fiber in the fiber bundle.

7. The method defined in claim 1 wherein the fiber bundle contains side-firing fibers and wherein applying the ultraviolet light comprises applying the ultraviolet light at a right angle relative to a longitudinal axis of at least one of the fibers.

8. The method defined in claim 1, wherein at least one of the light modulators comprises a mechanical shutter.

9. The method defined in claim 1, wherein at least one of the light modulators comprises a liquid crystal shutter.

10. The method defined in claim 1, wherein at least one of the light modulators a microelectromechanical attenuator.

11. A method for bonding a display module to a display cover glass layer, comprising:
applying liquid adhesive between the display module and the display cover glass layer, wherein a housing structure is positioned adjacent to the display cover glass layer, and wherein there is a gap between the display module and the housing structure; and
applying ultraviolet light to an edge of the liquid adhesive using fiber-based equipment, wherein the fiber-based equipment includes a fiber bundle containing a strip of side-firing fibers, and wherein applying the ultraviolet light to the edge of the liquid adhesive comprises inserting the fiber bundle into the gap and applying the ultraviolet light at a right angle relative to a longitudinal axis of the side-firing fibers.

12. The method defined in claim 11 wherein each side-firing fiber in the fiber bundle emits light, the method further comprising individually controlling the light emitted by each side-firing fiber.

13. The method defined in claim 12 wherein individually controlling the light comprises using light modulators in fiber paths associated with the side-firing fibers to modulate how much of the light is emitted from each side-firing fiber.

14. The method defined in claim 12 wherein individually controlling the light comprises individually controlling each of a plurality of light-emitting diodes that are each aligned with a respective side-firing fiber.

15. The method defined in claim 11, wherein the display cover glass layer bridges the gap between the display module and the housing structure.

16. The method defined in claim 11, wherein the gap between the display module and the housing structure is less than 300 microns.

17. The method defined in claim 11, wherein each side-firing fiber includes a prism that directs light at a right angle relative to the longitudinal axis of the side-firing fiber.

* * * * *

UNITED STATES PATENT AND TRADEMARK OFFICE
CERTIFICATE OF CORRECTION

PATENT NO. : 9,494,178 B2  
APPLICATION NO. : 14/183224  
DATED : November 15, 2016  
INVENTOR(S) : Cyrus Y. Liu et al.

Page 1 of 1

It is certified that error appears in the above-identified patent and that said Letters Patent is hereby corrected as shown below:

In the abstract, Line 5, "There-dimensional" should read --Three-dimensional--.

Signed and Sealed this  
Eighteenth Day of July, 2017

Joseph Matal  
*Performing the Functions and Duties of the*  
*Under Secretary of Commerce for Intellectual Property and*  
*Director of the United States Patent and Trademark Office*